(12) United States Patent
Shiotani

(10) Patent No.: US 10,057,788 B2
(45) Date of Patent: Aug. 21, 2018

(54) WIRELESS COMMUNICATION SYSTEM, WIRELESS COMMUNICATION APPARATUS, AND WIRELESS COMMUNICATION METHOD

(71) Applicant: Yoshimitsu Shiotani, Kanagawa (JP)

(72) Inventor: Yoshimitsu Shiotani, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 98 days.

(21) Appl. No.: 15/363,330

(22) Filed: Nov. 29, 2016

(65) Prior Publication Data

US 2017/0156066 A1    Jun. 1, 2017

(30) Foreign Application Priority Data

Dec. 1, 2015    (JP) ................................ 2015-234804

(51) Int. Cl.
*H04W 16/28* (2009.01)
*H04W 28/02* (2009.01)
(Continued)

(52) U.S. Cl.
CPC ............ *H04W 16/28* (2013.01); *H04B 7/026* (2013.01); *H04B 7/0408* (2013.01);
(Continued)

(58) Field of Classification Search
CPC .... H04B 7/02–7/0408; H04B 7/155–7/15592; H04B 17/318;
(Continued)

(56) References Cited

U.S. PATENT DOCUMENTS

| 2010/0260042 A1* | 10/2010 | Kwon ................. H04B 7/2606 370/227 |
| 2016/0007351 A1 | 1/2016 | Shiotani |
| 2016/0248662 A1 | 8/2016 | Shiotani |

FOREIGN PATENT DOCUMENTS

| JP | 2010-531559 | 9/2010 |
| JP | 2013-509826 | 3/2013 |

(Continued)

*Primary Examiner* — Timothy J Weidner
(74) *Attorney, Agent, or Firm* — Cooper & Dunham LLP

(57) ABSTRACT

A wireless communication system includes a first wireless communication apparatus and multiple second wireless communication apparatuses. The first wireless communication apparatus includes circuitry that detects that a wireless communication between the first wireless communication apparatus and at least one of the second wireless communication apparatuses is disconnected, requests, if the circuitry detects that the wireless communication with at least one of the second wireless communication apparatuses is disconnected, one of the second wireless communication apparatuses whose wireless communication is not disconnected to perform beam-forming training sequence directed to the second wireless communication apparatus whose wireless communication is disconnected, and determines, based on a result of the beam-forming training sequence acquired from the second wireless communication apparatus whose wireless communication is not disconnected, the second wireless communication apparatus whose wireless communication is not disconnected as a relay apparatus for the second wireless communication apparatus whose wireless communication is disconnected.

20 Claims, 18 Drawing Sheets

(51) Int. Cl.

| | |
|---|---|
| *H04W 36/20* | (2009.01) |
| *H04W 36/30* | (2009.01) |
| *H04W 36/32* | (2009.01) |
| *H04W 40/22* | (2009.01) |
| *H04W 48/10* | (2009.01) |
| *H04W 48/16* | (2009.01) |
| *H04W 48/20* | (2009.01) |
| *H04W 76/19* | (2018.01) |
| *H04W 88/04* | (2009.01) |
| *H04B 7/02* | (2018.01) |
| *H04B 7/04* | (2017.01) |
| *H04B 7/155* | (2006.01) |
| *H04B 17/318* | (2015.01) |
| *H04B 17/336* | (2015.01) |
| *H04B 17/40* | (2015.01) |
| *H04B 7/0408* | (2017.01) |
| *H04B 7/026* | (2017.01) |

(52) U.S. Cl.
CPC ....... *H04B 7/15507* (2013.01); *H04B 17/318* (2015.01); *H04B 17/336* (2015.01); *H04B 17/40* (2015.01); *H04W 28/0247* (2013.01); *H04W 36/20* (2013.01); *H04W 36/30* (2013.01); *H04W 36/32* (2013.01); *H04W 40/22* (2013.01); *H04W 48/10* (2013.01); *H04W 48/16* (2013.01); *H04W 48/20* (2013.01); *H04W 76/19* (2018.02); *H04W 88/04* (2013.01)

(58) Field of Classification Search
CPC .... H04B 17/336; H04B 17/40–17/409; H04W 16/02–16/12; H04W 16/28; H04W 24/02–24/10; H04W 28/02–28/0247; H04W 36/055–36/0077; H04W 36/08; H04W 36/14–36/385; H04W 40/22; H04W 48/02–48/20; H04W 84/18–84/22
See application file for complete search history.

(56) References Cited

FOREIGN PATENT DOCUMENTS

| | | |
|---|---|---|
| WO | WO2008/152113 A1 | 12/2008 |
| WO | WO2011/059818 A1 | 5/2011 |

* cited by examiner

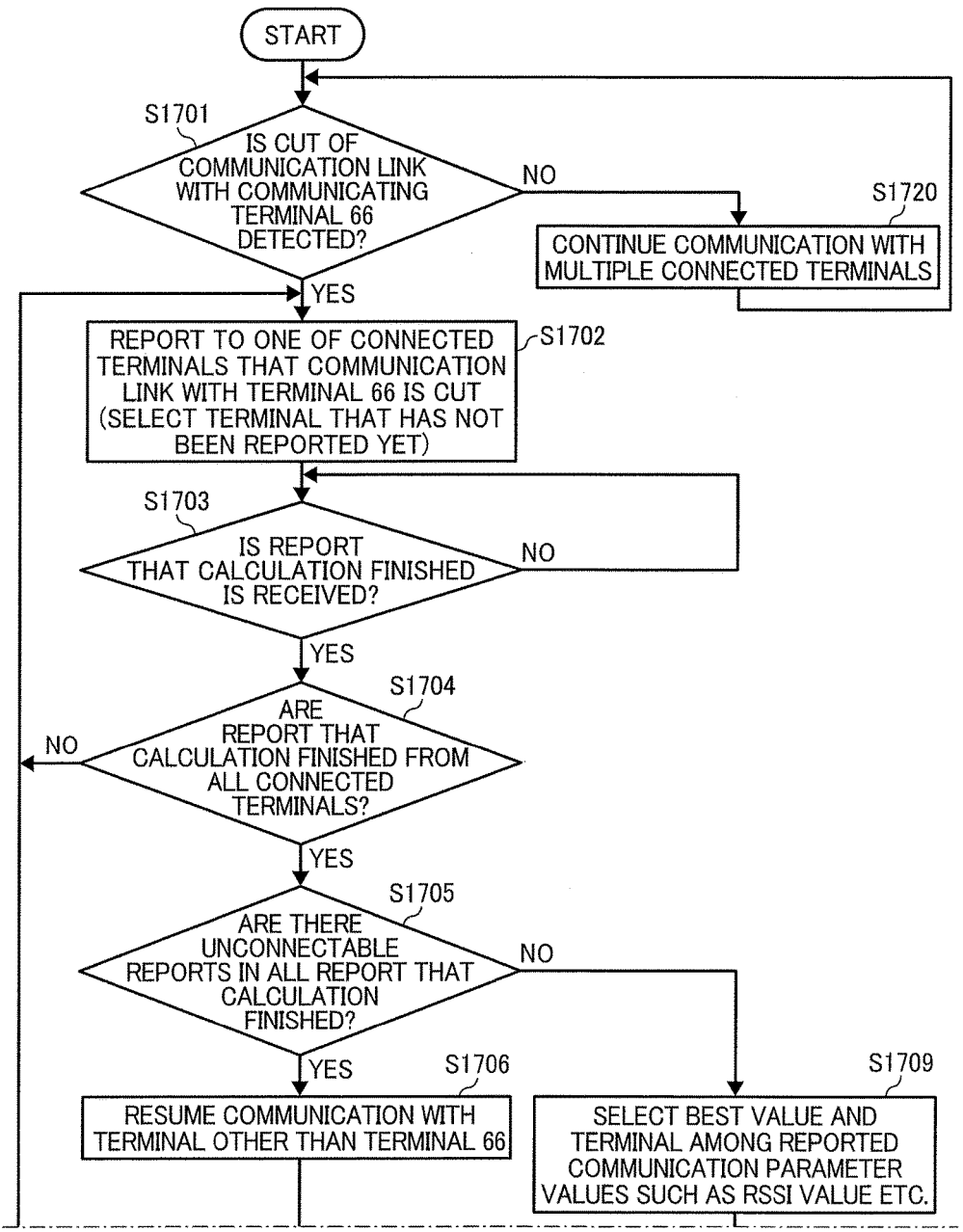

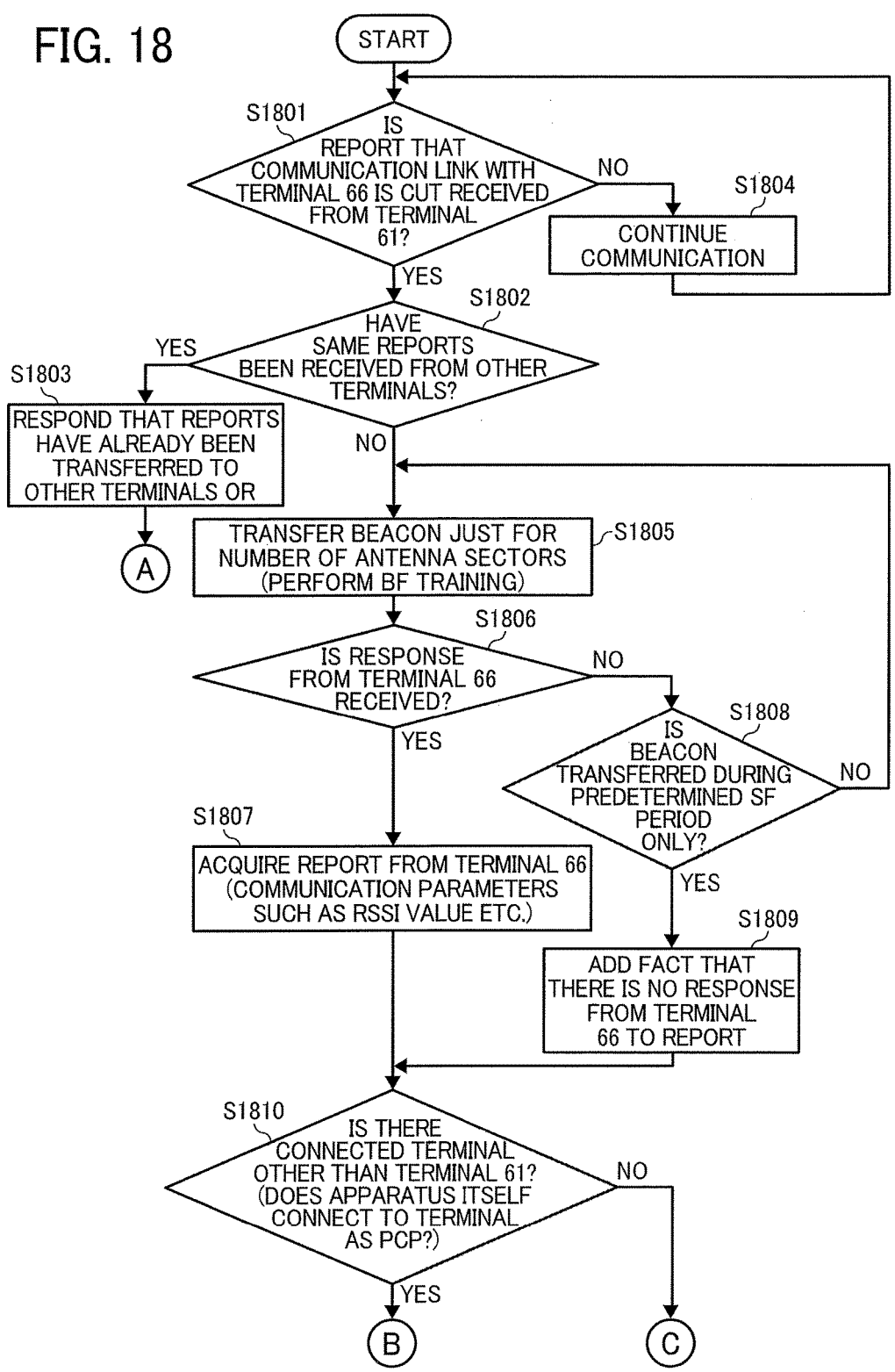

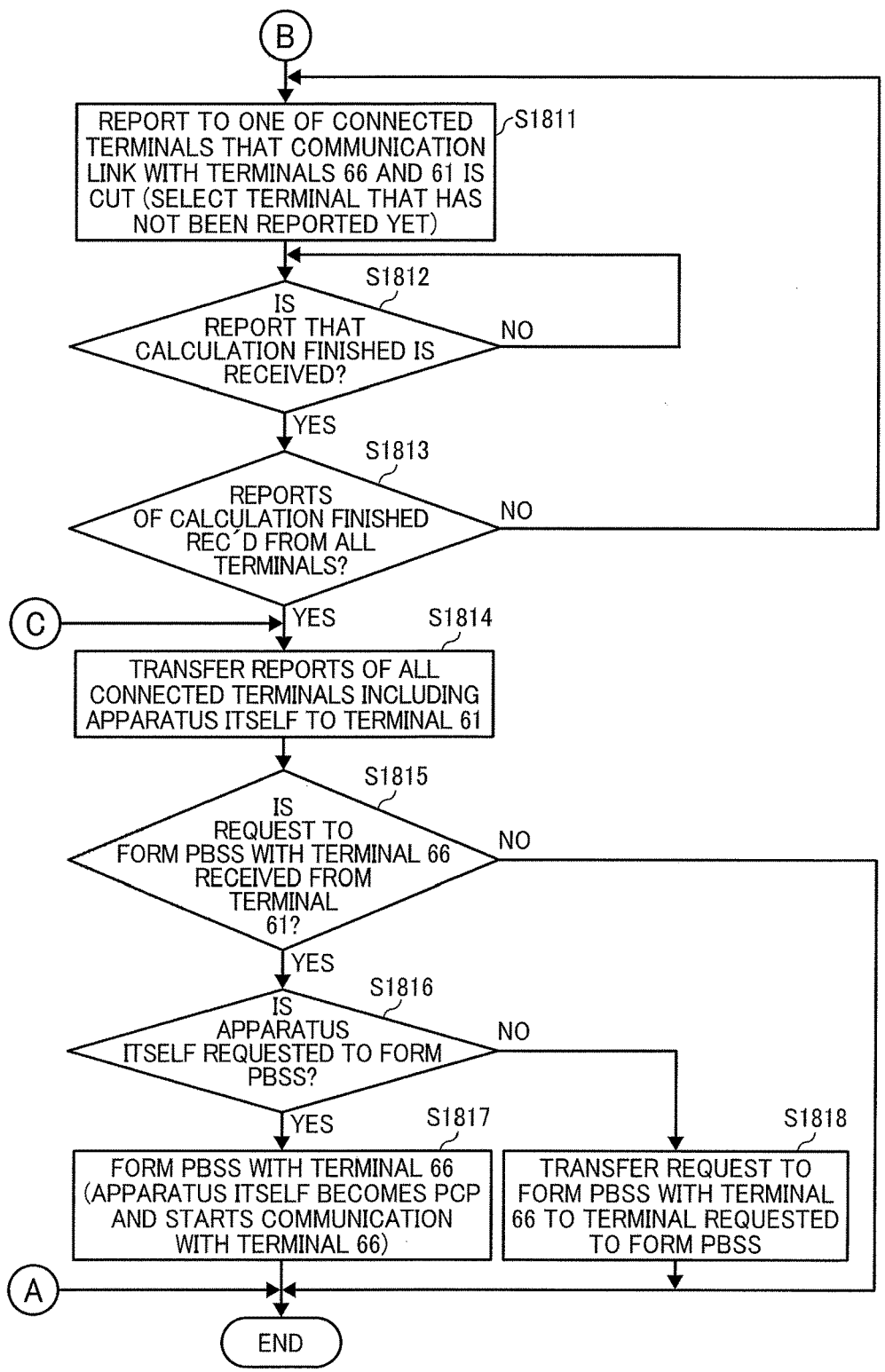

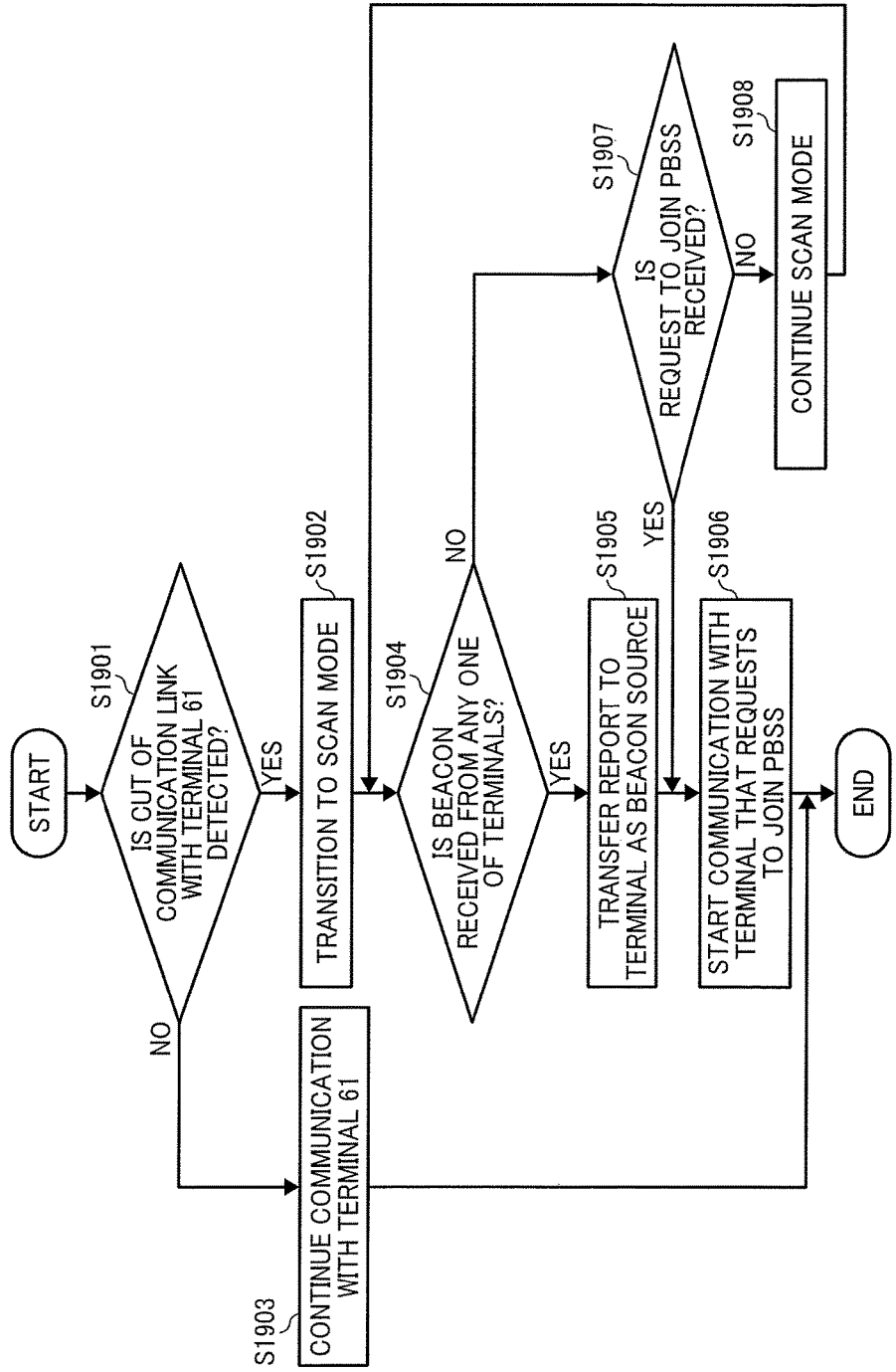

WIRELESS COMMUNICATION SYSTEM, WIRELESS COMMUNICATION APPARATUS, AND WIRELESS COMMUNICATION METHOD

CROSS-REFERENCE TO RELATED APPLICATION

This patent application is based on and claims priority pursuant to 35 U.S.C. § 119(a) to Japanese Patent Application No. 2015-234804, filed on Dec. 1, 2015 in the Japan Patent Office, the entire disclosure of which is hereby incorporated by reference herein.

BACKGROUND

Technical Field

The present invention relates to a wireless communication system, a wireless communication apparatus, and a wireless communication method.

Background Art

Recently, extremely high frequency (EHF) wireless communication technology is attracting attention as one type of high-speed communication technology and is expected to become popular in the near future after being standardized as IEEE 802.11ad.

In the standard IEEE 802.11ad, communication is performed using the 60 GHz band as an EHF band, and it is possible to perform high-speed and high-capacity communication since a very broad bandwidth is used (i.e., 2.16 GHz width per channel). However, while its directivity is strong, its range is short and its weak point is an obstacle in the communication path.

In transferring data from a source terminal to another terminal, in selecting whether or not data is transferred via a relay device, the source terminal determines whether or not the relay device is required based on a beam-forming gain, channel condition, transmission power, and directional ability of the relay device.

Alternatively, in a multi-hop network via multiple relay devices, in selecting a communication path, a hierarchical tree is created based on communication levels and diversity effects between terminals, and the communication path is selected based on the created hierarchical tree.

SUMMARY

Example embodiments of the present invention provide a novel wireless communication system that includes a first wireless communication apparatus and multiple second wireless communication apparatuses. The first wireless communication apparatus transfers communication data to the multiple second wireless communication apparatuses using wireless communication. The first wireless communication apparatus includes circuitry that detects that a wireless communication between the first wireless communication apparatus and at least one of the second wireless communication apparatuses is disconnected, requests, if the circuitry detects that the wireless communication with at least one of the second wireless communication apparatuses is disconnected, one of the second wireless communication apparatuses whose wireless communication is not disconnected to perform beam-forming training sequence directed to the second wireless communication apparatus whose wireless communication is disconnected, and determines, based on a result of the beam-forming training sequence acquired from the second wireless communication apparatus whose wireless communication is not disconnected, the second wireless communication apparatus whose wireless communication is not disconnected as a relay apparatus for the second wireless communication apparatus whose wireless communication is disconnected.

Further example embodiments of the present invention provide an information processing apparatus and an information processing method.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIGS. 17A and 17B are flowcharts illustrating an operation of a first communication apparatus when multiple wireless communication apparatuses communicate with each other as an embodiment of the present invention;

FIG. 18 is a flowchart illustrating an operation of a second communication apparatus whose communication link is not cut when multiple wireless communication apparatuses communicate with each other as an embodiment of the present invention;

FIG. 19 is a flowchart illustrating an operation of the second communication apparatus whose communication link is not cut when multiple wireless communication apparatuses communicate with each other as an embodiment of the present invention;

FIG. 20 is a flowchart illustrating an operation of the second communication apparatus whose communication link is cut when multiple wireless communication apparatuses communicate with each other as an embodiment of the present invention;

Figure 1A:
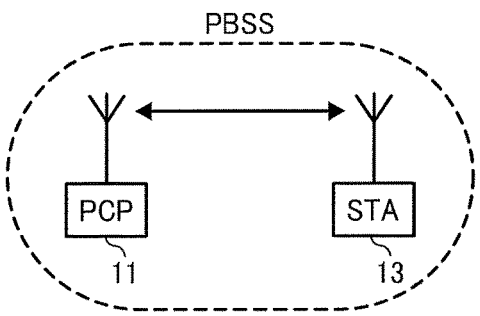
FIG. 1A is a diagram illustrating Personal Basic Service Set (PBSS) constructed by one-to-one communication between PCP and STA.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted appropriately.

In the technology described before, it is assumed that only one relay apparatus is used. In addition, an access point as the relay apparatus is located on a ceiling. In case of transferring data from a source terminal to a target terminal, it is possible to modify a transmission route only when data is either directly transferred from the source terminal to the target terminal or transferred via the access point located on the ceiling A multi-hop network including multiple relay apparatuses is not disclosed in the technology.

Alternatively, it is assumed that data is broadcast from a source to multiple receiving terminals, and the technology is applied to communication in the down communication link direction only. The technology fails to describe communication between the source terminal and another specific terminal.

A wireless communication system that may communicate with other wireless communication apparatuses stably by forming an alternative communication route dynamically even if the wireless communication apparatuses may not communicate with each other due to an obstacle, etc., is provided in the embodiments below. Furthermore, in the wireless communication system described below, by controlling a wireless communication apparatus that performs a beam-forming training sequence sequentially, it is possible to select a candidate for the relay apparatus reliably even if there are many candidate wireless communication apparatuses available.

Beam-Forming Technology

Firstly, EHF wireless communication, TDMA time slot, and a beam-forming technology using a directional antenna array related to the embodiments are briefly described below.

The EHF wireless communication used for IEEE 802.11ad uses a 60 GHz wireless band. Therefore, a radio wave signal attenuates very largely, and it is required to keep an antenna gain high. As a result, it is necessary to use a high directivity antenna. Therefore, it is difficult to emit radio waves in all directions from the wireless communication apparatus simultaneously, and it is difficult to detect all wireless terminals located around the wireless communication apparatus simultaneously.

Consequently, Carrier Sense Multiple Access/Collision Avoidance (CSMA/CA) conventionally used for wireless LAN using a microwave band (e.g., IEEE 802.11ac as a typical wireless LAN communication standard) protocol cannot be used. Therefore Time Division Multiple Access (TDMA) communication protocol is used for the EHF wireless communication.

In addition, in the EHF wireless communication, Personal Basic Service Set (PBSS) as a new network cell is defined, and a coordination apparatus called PBSS Central Point/Access Point (PCP/AP) (hereinafter referred to as "PCP") that manages time slots in TDMA protocol is located in the network cell.

Since a directional antenna is used in EHF wireless communication, radio wave intervention emitted by the wireless communication apparatus is kept low, congestion is kept low even if multiple communication links are constructed in the same space, and communication speed is not reduced. However, even in case of enlarging the antenna gain, the longest communication distance between the wireless communication apparatuses is approximately 10 m. Since a range that may communicate with the highest communication speed is limited to 2 to 3 meters, EHF wireless communication is so-called short-range, high-speed wireless communication.

As the network topologies, there is one-to-one communication between the PCP that manages time slots and a station that receives data from the PCP (hereinafter referred to as "STA") and star-shape topology that includes the PCP and the multiple STA.

Figure 1B:
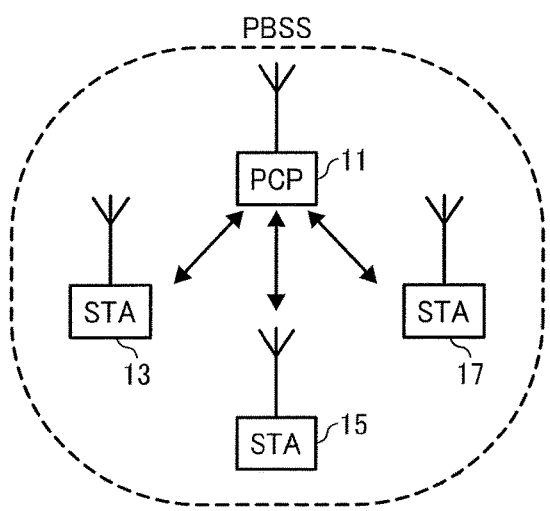
FIG. 1B is a diagram illustrating PBSS constructed by one-to-N communication between PCP and multiple STAs.

FIG. 1A is a diagram illustrating PBSS constructed by one-to-one communication between the PCP and the STA, and FIG. 1B is a diagram illustrating PBS S constructed by one-to-N communication between PCP and multiple STAs (i.e., N is integer larger than zero).

In FIG. 1A, the wireless communication apparatus 11 functions as the PCP, the wireless communication apparatus 13 functions as the STA, and the wireless communication apparatus 11 manages time slots in TDMA protocol. In FIG. 1B, the wireless communication apparatus 11 functions as the PCP, the wireless communication apparatuses 13, 15, and 17 function as the STAs, and the wireless communication apparatus 11 manages time slots in TDMA protocol.

Allocation of Time Slots

Figure 2:
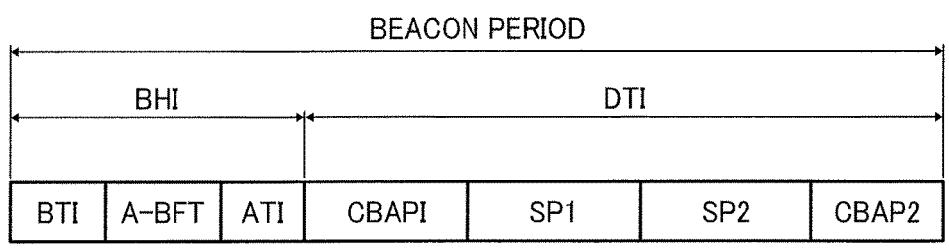
FIG. 2 is a diagram illustrating time slot allocation in TDMA protocol managed by PCP as an embodiment of the present invention.

Next, time slot allocation in TDMA protocol managed by the PCP is described below with reference to FIG. 2.

Time slots in TDMA protocol are broadly divided into Beacon Header Interval (BHI) and Data Transfer Interval (DTI). Beacon Transmission Interval (BTI), Association Beam-forming Training (A-BFT), and Announcement Transmission Interval (ATI) are allocated to BHI, and Contention Based Access Period (CBAP) and Service Period (SP) are allocated to DTI. BTI allocated to BHI is a period that the wireless communication apparatus as PCP transfers beacon frames for the number of antenna sectors, A-BFT is a period to improve precision of beam-forming, and ATI is a period that management information and control information are exchanged between PCP and a non-PCP terminal.

In addition, CPAP allocated to DTI is a period that each terminal communicates with each other using wireless communication by using channel conflict access method, and SP is a period reserved for communication between a pair of wireless terminals.

In BTI in time slots, PCP transfers beacon frames for the number of antennas included in the wireless communication apparatus itself and the number of antenna sectors included in each antenna. After configuring antenna as a non-directional antenna or semi-directional antenna, STA receives all beacon frames transferred by PCP and feedbacks an antenna ID and antenna sector ID whose reception quality is the best to PCP. As a result, the PCP can grasp which antenna sector to use to perform wireless communication.

Beam-Forming Technology

Next, a beam-forming technology using the directional antenna array is described below.

Among multiple beam-forming technologies, Sector Level Sweep (SLS) is described below as an example.

There are two types in SLS, Tx Sector Sweep (TXSS) and Rx Sector Sweep (RXSS). TXSS is a beam-forming training for deciding a transmitting antenna configuration, and RXSS is a beam-forming training for deciding a receiving antenna configuration.

Figure 3:
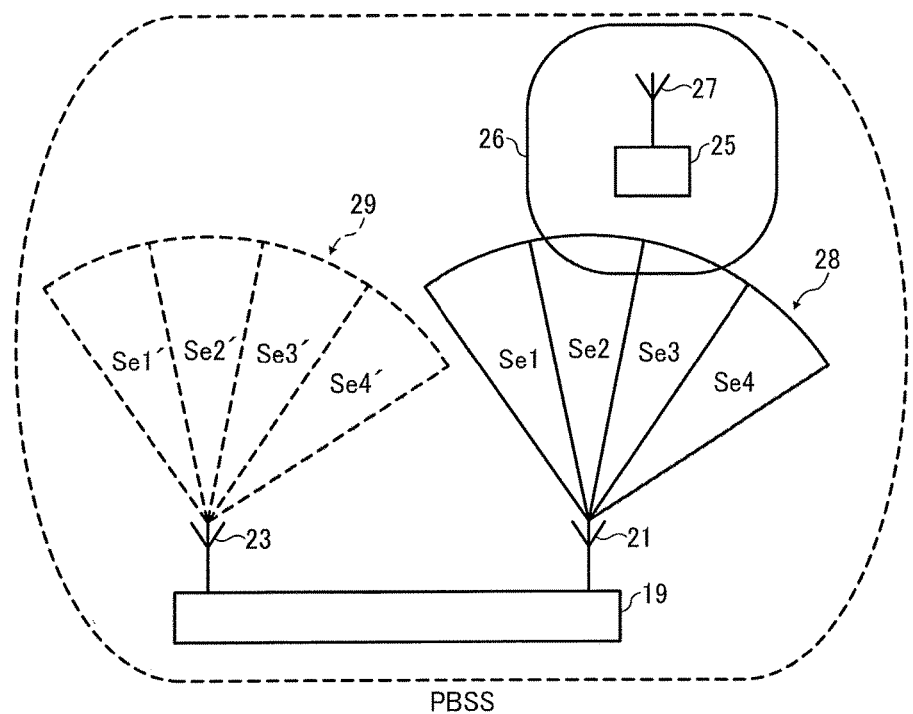
FIG. 3 is a diagram illustrating sector level sweep (SLS) as an embodiment of the present invention.

FIG. 3 is a diagram roughly illustrating SLS. In FIG. 3, to illustrate antenna sectors in an easily understood manner, antennas 21 and 23 of the wireless communication apparatus 19 are illustrated with a wider interval, only four antenna sectors in the direction where the wireless communication apparatus 25 exists are illustrated, and other antenna sectors are omitted.

First, in TXSS, predetermined packets are transferred by switching multiple sectors in beam pattern 28 (i.e., sectors Se1 to Se4 in FIG. 3) from the antenna 21 of the wireless communication apparatus 19 as PCP. After transferring packets using multiple beam patterns, just like the case described above, predetermined packets are transferred by switching multiple sectors in beam pattern 29 (i.e., sectors Se1' to Se4' in FIG. 3) from the antenna 23 of the wireless communication apparatus 19 as PCP.

On the other hand, in the wireless communication apparatus 25 as STA, the antenna 27 is configured as a quasi-omni-directional antenna, and the STA receives packets from the wireless communication apparatus 19 as PCP using quasi-omni-directional antenna pattern 26 and feedbacks which communication quality of a packet transferred using a sector (i.e., antenna ID and antenna sector ID) is better to the wireless communication apparatus 19.

RXSS is a beam-forming training sequence in the direction opposite to TXSS described above. After finishing beam-forming trainings in the transmitting direction and receiving direction, it is possible to perform directional wireless communication within PBSS.

Configuration of a Wireless Communication System

Next, the wireless communication system in this embodiment is described below in detail.

Figure 4:
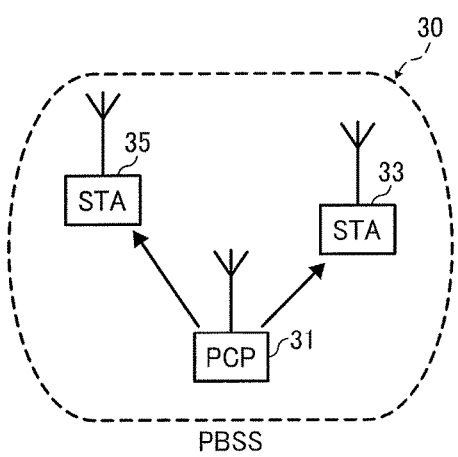
FIG. 4 is a diagram illustrating a wireless communication system as an embodiment of the present invention.

FIG. 4 is a diagram illustrating a wireless communication system in this embodiment. In FIG. 4, a wireless communication system 30 includes PBSS constructed by multiple wireless communication apparatuses 31, 33, and 35 including a directional antenna used for EHF wireless communication.

In FIG. 4, a wireless communication apparatus 31 functions as PCP as an information source and transfers data such as contents etc. to wireless communication apparatuses 33 and 35 as STAs.

In the following description, PCP as the information source is referred to as a first wireless communication apparatus, wireless communication apparatuses function as STAs are referred to as second wireless communication apparatuses, and a wireless communication apparatus that functions both STA and PCP is referred to as a relay apparatus. In constructing PBSS, the beam-forming is performed as described before. In PCP and STA, it is determined which communication quality of packets transferred/received from a sector is the best, and the antenna ID and antenna sector ID whose communication quality is high are used.

The wireless communication apparatus 31 reserves SP time slot in TDMA protocol in order of the wireless communication apparatuses 33 and 35, and data is transferred from the wireless communication apparatus 31 to the wireless communication apparatuses 33 and 35. In the above description, the wireless communication apparatus 31 is referred to as PCP. However, it is still possible reference the wireless communication apparatuses 33 and 35 as PCP and reference the other wireless communication apparatuses as STAs. In addition, while two wireless communication apparatuses are used as STAs in the above description, it is still possible to use one wireless communication apparatus as an information destination.

Hardware Configuration of the Wireless Communication Apparatus

Figure 5:
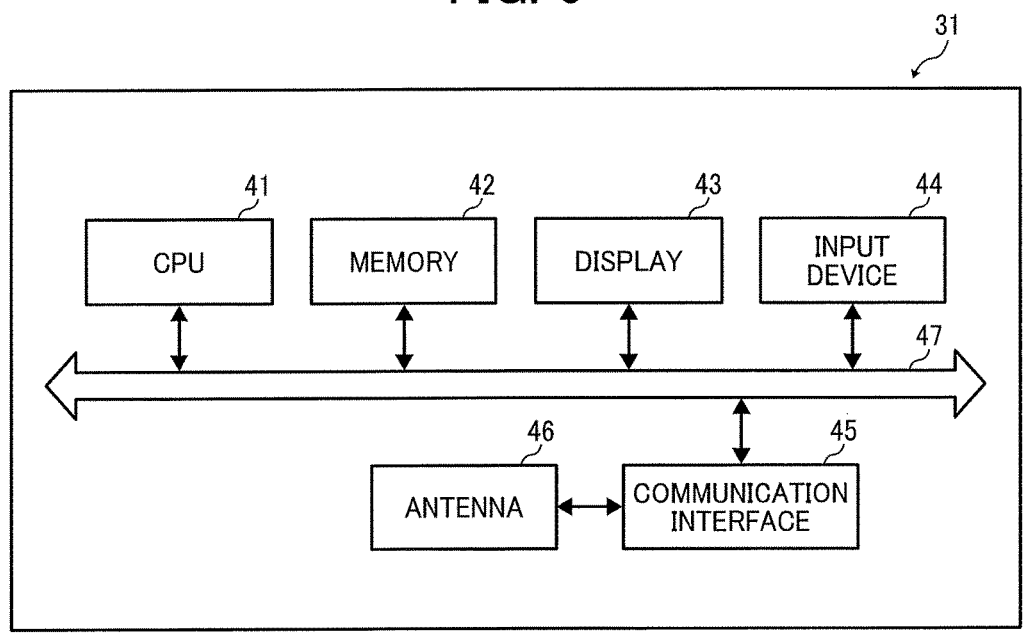
FIG. 5 is a block diagram illustrating a hardware configuration of a wireless communication apparatus used for the wireless communication system as an embodiment of the present invention.

FIG. 5 is a diagram illustrating a hardware configuration of a wireless communication apparatus 31 in this embodiment.

Since the communication apparatuses include a similar hardware configuration, the communication apparatus 31 in FIG. 5 is used as a representative in the description below.

The wireless communication apparatus 31 includes a central processing unit (CPU) 41, a memory 42, a display 43 such as a display unit etc., an input device 44 such as a keyboard etc., a communication interface (I/F) 45, and an antenna 46, and those components are connected with each other via a bus 47.

The CPU 41 implements functions in the wireless communication apparatus 31 by executing programs etc. stored in the memory 42. The memory 42 is constructed by storage devices such as a Read Only Memory (ROM) and a Random Access Memory (RAM) etc. The memory 42 stores programs executed by the wireless communication apparatus 31, communication data, and management information etc.

For example, the display 43 displays data regarding communication performed by the wireless communication apparatus 31. The configuration of the display 43 may connect to a display interface using a cable etc. In this case, a cable for analog RGB (VGA), a cable for component video, or a cable for High-Definition Multimedia Interface (HDMI) or Digital Visual Interface (DVI) may be used.

The input device 44 is an input interface such as a keyboard and operation button etc. and accepts various inputs by user operation. For example, by operating the input device 44, it is possible to select a way of controlling the wireless communication apparatus 31 based on the data displayed on the display 43 by user operation. The input device 44 may include various aspects as long as it can accept input by user operation. For example, the input device 44 may be a touch panel etc. constructed en bloc with a display unit as the display 43.

The communication interface 45 is an interface for communicating with other wireless communication apparatuses and includes a function of performing wireless communication such as a RF unit and a modem etc.

The antenna 46 is connected to the communication interface 45 and for performing wireless communication with the other wireless communication apparatuses. The antenna 46 is constructed by an active antenna such as the phased array antenna etc., and directivity of the antenna 46 may be controlled from non-directional or quasi-omni-directional to narrow directivity.

As a result, in TXSS in the beam-forming training sequence, the antenna 46 may function as a directional antenna, and in RXSS, the antenna 46 may function as a non-directional or quasi-omni-directional antenna. After finishing the beam-forming training, the antenna 46 may function as a directional antenna to construct a communication link with less radio wave intervention.

Functional Blocks of the Wireless Communication Apparatus

Figure 6:
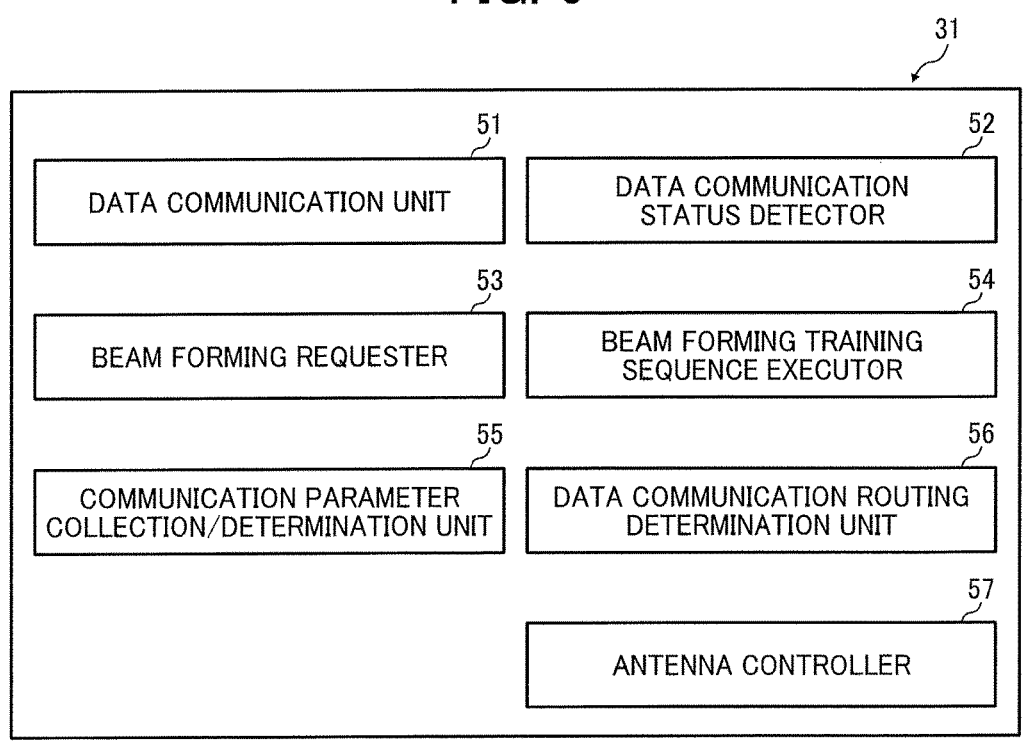
FIG. 6 is a diagram illustrating functional blocks indicating functions implemented by a CPU included in the wireless communication apparatus as an embodiment of the present invention.

Next, a function implemented by the CPU 41 included in the wireless communication apparatus 31 is described below with reference to a functional block diagram illustrated in FIG. 6. Since the wireless communication apparatuses in FIG. 6 include a similar hardware configuration as in FIG. 5, the wireless communication apparatus 31 FIG. 6 is used as a representative in the description below.

Functions implemented by the CPU 41 are a data communication unit 51, a data communication status detector 52, a beam-forming requester 53, a beam-forming training sequence executor 54, a communication parameter collection/determination unit 55, a data communication routing determination unit (determining unit) 56, and an antenna controller 57, and the functions described above are implemented by executing a program stored in the memory 42 by the CPU 41.

The data communication unit 51 communicates contents data with other wireless communication apparatuses that construct the wireless communication system via the antenna 46 and includes a signal processor, a protocol controller, and a RF unit etc. In this case, image information and video information etc. processed by the wireless communication apparatus 31 are the contents data. The image information and the video information etc. are stored in the memory 42. The data communication unit 51 performs wireless communication with the other wireless communication apparatuses using the wireless communication standard such as the EHF wireless communication.

The data communication condition detector 52 detects communication condition of the data communication performed by the data communication unit 51. For example, the data communication condition detector 52 monitors a data communication status in a communication channel such as establishing a communication link and cutting a communication link etc. in the communication channel from a receiving signal strength value (RSSI value) and SNR value etc.

After the data communication status detector 52 detects that communication link with the wireless communication apparatus as STA is cut, the beam-forming requester 53 requests the wireless communication apparatus as the other STA whose communication link is not cut to perform the beam-forming training sequence. After receiving the beam-forming training sequence, the other wireless communication apparatus transfers beacon frames for the number of the antenna sectors, and after receiving the beacon frames, the other wireless communication apparatus feeds back information on the antenna sector number whose communication quality is the best to the wireless communication apparatus that transfers the beacon frames.

Communication Parameters

The communication quality depends on RSSI value, SNR value as other communication parameters, communication throughput value, maximum modulation and coding scheme (MCS) value, average MCS value, the number of retransmitting times by transmitting test data, connection quality value, and information on the number of hops to the wireless communication apparatus whose communication link is cut. In the following description, those values and information described above including RSSI value and SNR value etc. are referred to as communication parameters collectively.

If the wireless communication apparatus functions as STA, in case of receiving the request for beam-forming from PCP in PBSS that the wireless communication apparatus itself belongs to, the beam-forming training sequence executor 54 performs beam-forming training to the wireless communication apparatus whose communication link with the wireless communication apparatus as PCP is cut.

The communication parameter collection/determination unit 55 receives the result of the beam-forming sequence performed by the wireless communication apparatus as STA whose communication link with the wireless communication apparatus as PCP is not cut from each wireless communication apparatus to collect and determine communication parameters between the wireless communication apparatus whose communication link is cut and the wireless communication apparatus whose communication link is not cut.

Based on communication parameters between the wireless communication apparatus whose communication link with the wireless communication apparatus as PCP is cut and the wireless communication apparatus whose communication link is not cut, the data communication routing determination unit 56 determines a communication routing using which wireless communication apparatus as a relay apparatus to establish a communication link.

The antenna controller 57 controls directivity including non-directional and quasi-omni-directional for the active antenna that constructs the antenna 46 and controls antenna ID and antenna sector ID etc. if the antenna 46 functions as the directional antenna.

First Embodiment

Rerouting Communication

Next, a sequence of changing the communication route in the wireless communication system in this embodiment is described below with reference to FIGS. 4 and 7 to 11. In the following description, the wireless communication apparatus may be referred to as a wireless terminal or simply a terminal.

Figure 7:
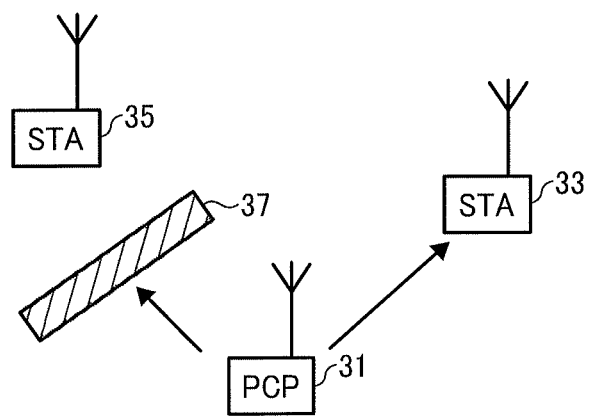
FIG. 7 is a diagram illustrating an operation of changing a communication path in the wireless communication system as an embodiment of the present invention.
Figure 8:
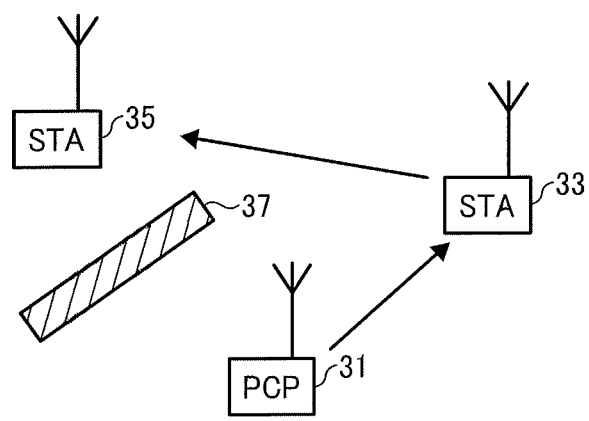
FIG. 8 is a diagram illustrating an operation of changing a communication path in the wireless communication system as an embodiment of the present invention.
Figure 9:
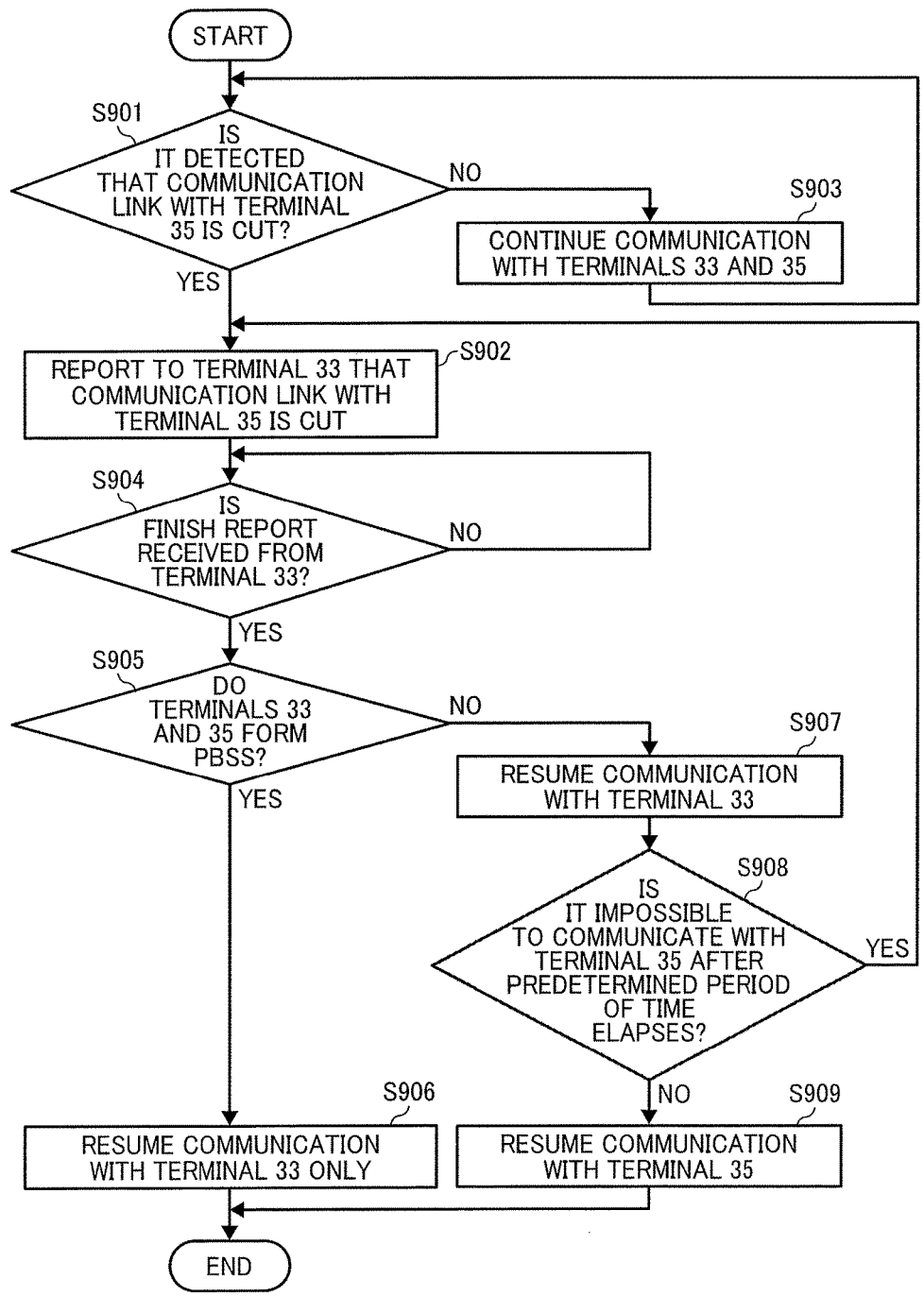
FIG. 9 is a flowchart illustrating an operation of a wireless communication apparatus 31 when a communication link is cut as an embodiment of the present invention.
Figure 10:
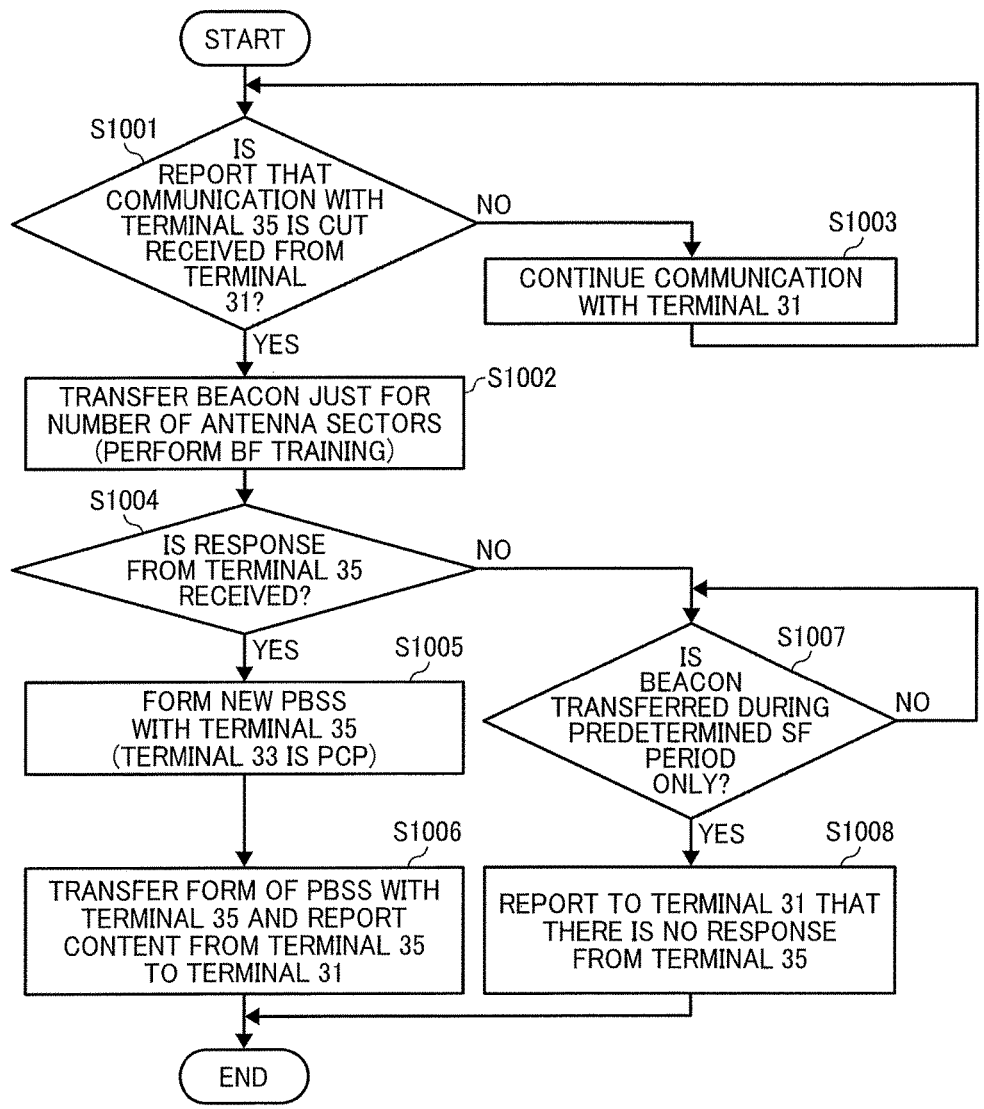
FIG. 10 is a flowchart illustrating an operation of a wireless communication apparatus 33 when a communication link is cut as an embodiment of the present invention.
Figure 11:
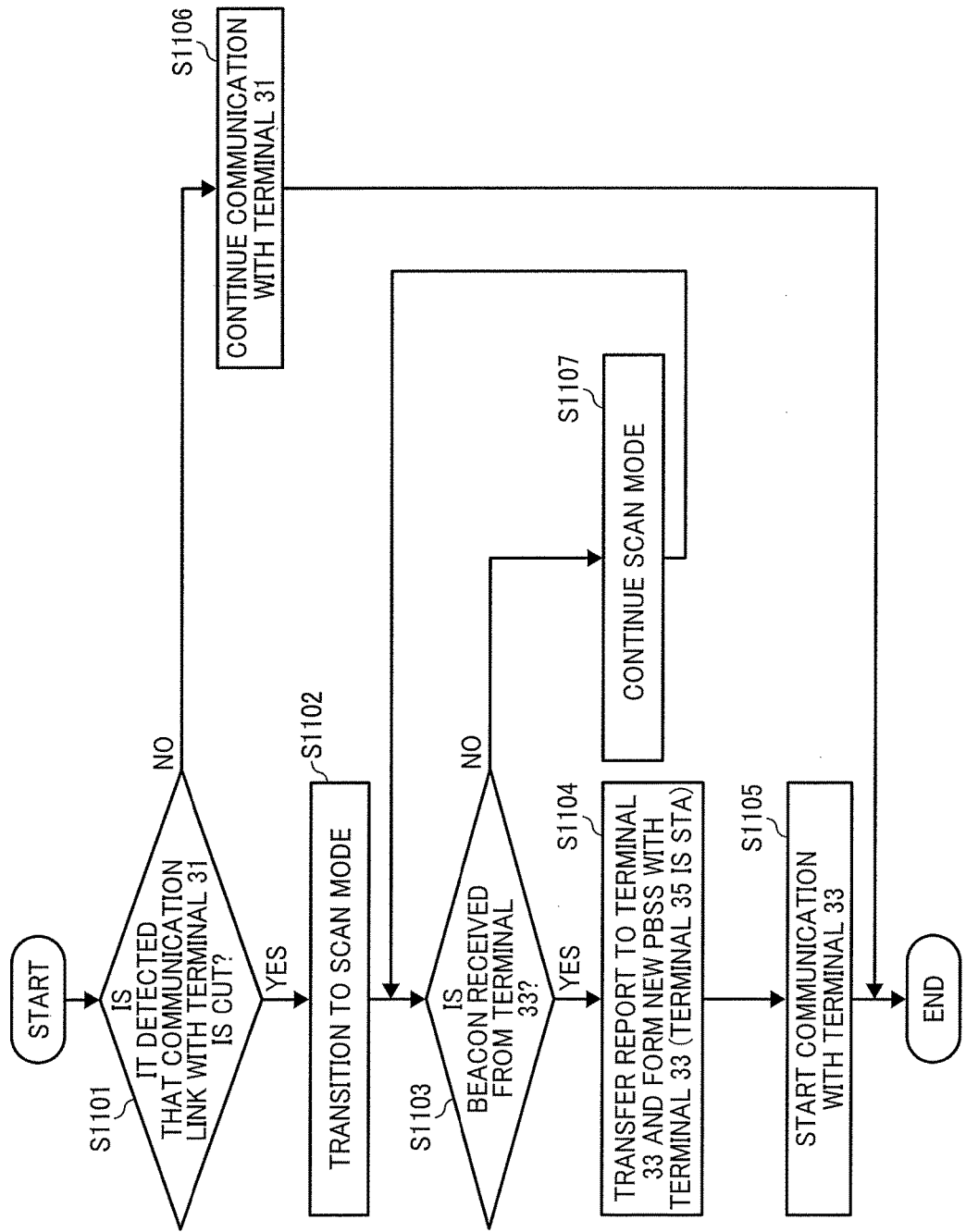
FIG. 11 is a flowchart illustrating an operation of a wireless communication apparatus 35 when a communication link is cut as an embodiment of the present invention.

In FIG. 7, in the network in FIG. 4, an obstacle (including a person) 37 enters between the wireless terminal 31 as PCP and the wireless terminal 35 as STA, and a communication link between the wireless terminal 31 and the wireless terminal 35 is cut. In FIG. 8, after the situation in FIG. 7, the wireless terminal 33 as STA becomes PCP for the wireless terminal 35 to form a multi-hop channel, and data from the wireless terminal 31 is transferred to the wireless terminal 35 via the wireless terminal 33. FIG. 9 is a flowchart illustrating an operation of the wireless terminal 31, FIG. 10 is a flowchart illustrating an operation of the wireless terminal 33, and FIG. 11 is a flowchart illustrating an operation of the wireless terminal 35.

Wireless Terminal 31

First, in FIG. 9, in the wireless terminal 31 that is an information source and functions as PCP, after the data communication status detector 52 detects that a communication link with the wireless terminal 35 as one of the wireless terminals that function as STA (YES in S901), the beam-forming requester 53 reports a communication link cut notification indicating that the communication link with the wireless terminal 35 is cut to the wireless terminal 33 whose communication link is not cut in S902. The communication link cut notification becomes a request for beam-forming training sequence to the wireless terminal 33.

By contrast, if it is not detected that the communication link with the wireless terminal 35 is cut (NO in S901), the wireless terminal 31 continues communication with the wireless terminals 33 and 35 in S903. Here, the wireless terminal 31 is a first wireless communication apparatus, the wireless terminal 33 is a second wireless communication apparatus whose communication link is not cut, and the wireless terminal 35 is a second wireless communication apparatus whose communication link is cut.

Wireless terminal 33 In FIG. 10, after receiving the notification indicating that the communication link with the wireless terminal 35 is cut (i.e., the request for beam-forming training sequence) (YES in S1001), in the wireless terminal 33, the beam-forming training sequence executor 54 transfers beacons for the number of antenna sectors to perform the beam-forming training in S1002. By contrast, in case of not receiving the notification indicating that the communication link with the wireless terminal 35 is cut from the wireless terminal 31 (NO in S1001), the communication with the wireless 31 is continued in S1003.

Wireless Terminal 35

In FIG. 11, after detecting that the communication link with the wireless terminal 31 is cut (YES in S1101), the wireless terminal 35 transitions to a scan mode in S1102. In the scan mode, after receiving beacons from the wireless terminal 33 (YES in S1103), a report as a result of the beam-forming training is sent to the wireless terminal 33, and new PBSS is formed with the wireless terminal 33 in S1104.

Here, the report sent to the wireless terminal 33 indicates which communication quality of beacon sent from an antenna sector is higher among beacons transferred by the wireless terminal 33. Therefore, it is possible to report an antenna ID and antenna sector ID whose communication quality is higher, and it is also possible to report information such as RSSI value for each antenna ID and antenna sector ID, SNR value as other communication parameters, communication throughput value, maximum MCS value, average MCS value, the number of retransmission value by transferring test data, connection quality value, and the number of hops to the wireless communication apparatus whose communication link is cut etc.

Based on the received report, the wireless terminal 33 determines an antenna ID and antenna sector ID used for the communication with the wireless terminal 35.

Wireless Terminal 35

In FIG. 11, after forming the new PBSS between the wireless terminal 35 and the wireless terminal 33, the wireless terminal 35 starts communicating with the wireless terminal 33 in S1105 and receives data transferred by the wireless terminal 31 via the wireless terminal 33.

By contrast, if it is not detected that the communication link with the wireless terminal 31 is cut (NO in S1101), the wireless terminal 35 continues communication with the wireless terminal 31 in S1106.

In wireless terminal 35, after detecting that the communication link with the wireless terminal 31 is cut and transitioning to the scan mode, in case of not receiving beacons from the wireless terminal 33 (NO in S1103), the scan mode is continued in S1107.

Wireless Terminal 33

In FIG. 10, after transferring beacons for the number of antenna sectors, the wireless terminal 33 waits for receiving the report as the result of beam-forming training in the wireless terminal 35. After receiving the report (response) indicating the result of beam-forming training from the wireless terminal 35 (YES in S1004), based on the received training result, the antenna controller 57 determines an antenna ID and antenna sector ID to be used and form new PBSS with the wireless terminal 35.

In this case, the wireless terminal 33 functions as STA in PBSS with the wireless terminal 31 and functions as PCP in PBSS with the wireless terminal 35 in S1005. Subsequently, a report indicating that PBSS is formed with the wireless terminal 35 and the result of beam-forming training received from the wireless terminal 35 is sent to the wireless terminal 31 in S1006.

In FIG. 10, in case of not receiving the response from the wireless terminal 35 (NO in S1004), the wireless terminal 31 transfers beacons only during a predetermined super frame (SF) period. If the SF period does not elapse (NO in S1007), it is continued to transfer beacons. If the SF period elapses (YES in S1007), a report indicating there is no response from the wireless terminal 35 is sent to the wireless terminal 31 in S1008.

Wireless Terminal 31

In FIG. 9, in the wireless terminal 31, after receiving the finish report from the wireless terminal 33 (i.e., the notification including the form of the new PBSS and the result of beam-forming training or the notification indicating that there is no response from the wireless terminal 35) (YES in S904), the data communication routing determination unit 56 resumes communication only with the wireless terminal 33 in S906 if the wireless terminals 33 and 35 form the new PBSS (YES in S905). That is, if the finish notification received from the wireless terminal 33 is the report indicating that the wireless terminals 33 and 35 form the new PBSS and the report from the wireless terminal 35, since the wireless terminal 35 forms PBSS with the wireless terminal 33, data transferred by the wireless terminal 31 is sent to the wireless terminal 35 via the wireless terminal 33 as the relay apparatus.

By contrast, if the finish notification received from the wireless terminal 33 is the report indicating that there is no response from the wireless terminal 35, since the wireless terminals 33 and 35 do not form the new PBSS (NO in S905), the wireless terminal 31 continues communication only with the wireless terminal 33 for a predetermined period of time in S907 and waits for recovery of the communication link with the wireless terminal 35. If the communication link with the wireless terminal 35 is not recovered even if the predetermined period of time elapses (YES in S908), in the wireless terminal 31, the beam-forming requester 53 transfers the notification indicating that the communication link is cut as the request for beam-forming to establish the communication link with the wireless terminal 35 to the wireless terminal 33 in S902. If the predetermined period of time elapses and it is possible to communicate with the wireless terminal 35 (NO in S908), the communication with the wireless terminal 35 is resumed in S909.

Relay Apparatus

Figure 12A:
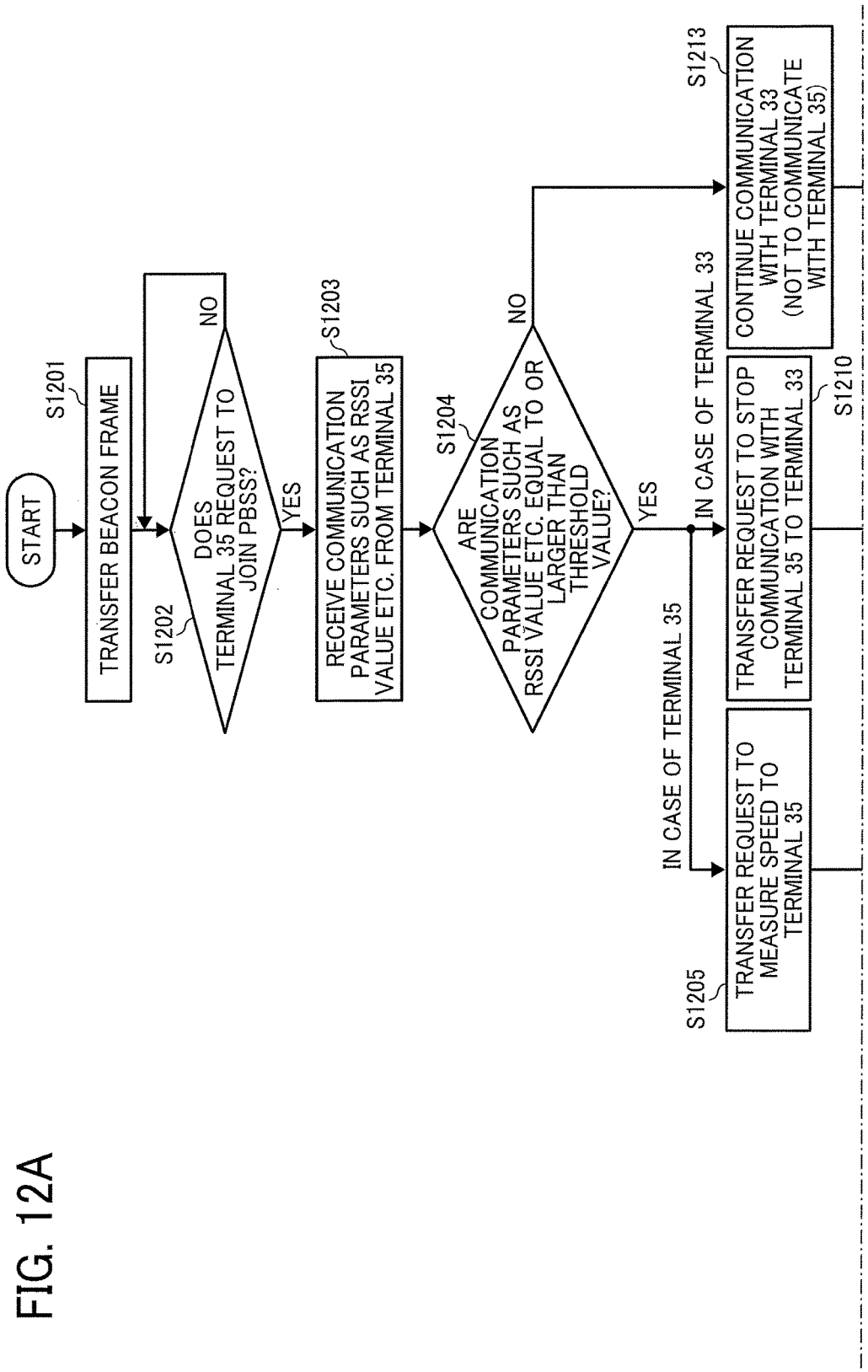
FIGS. 12A and 12B are flowcharts illustrating an operation of a wireless communication apparatus 31 when a communication link is recovered as an embodiment of the present invention.
Figure 12B:
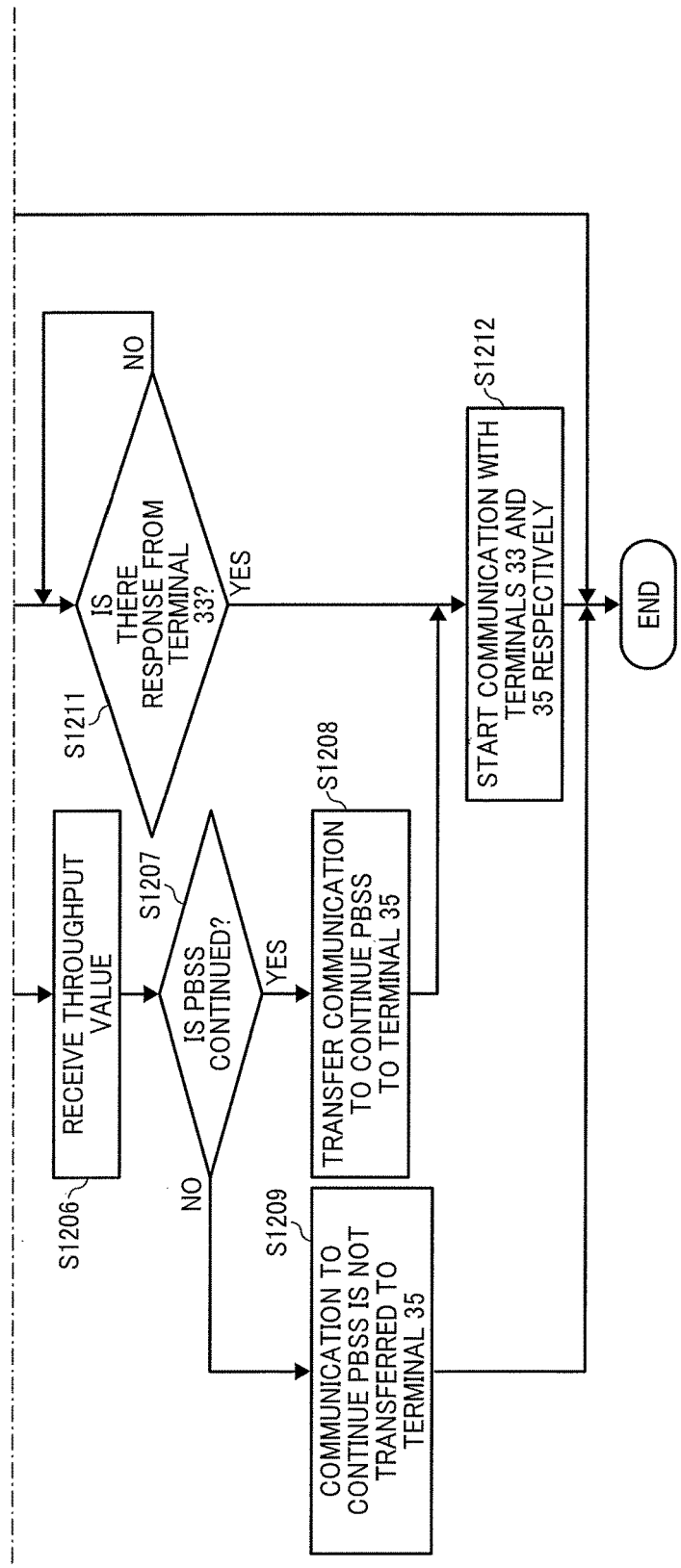
Figure 13:
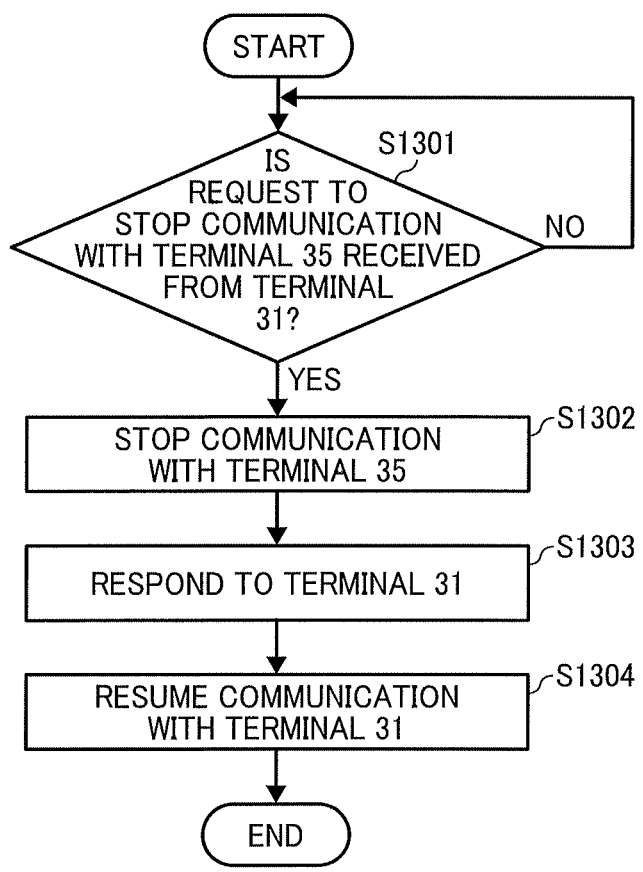
FIG. 13 is a flowchart illustrating an operation of a wireless communication apparatus 33 when a communication link is recovered as an embodiment of the present invention.
Figure 14:
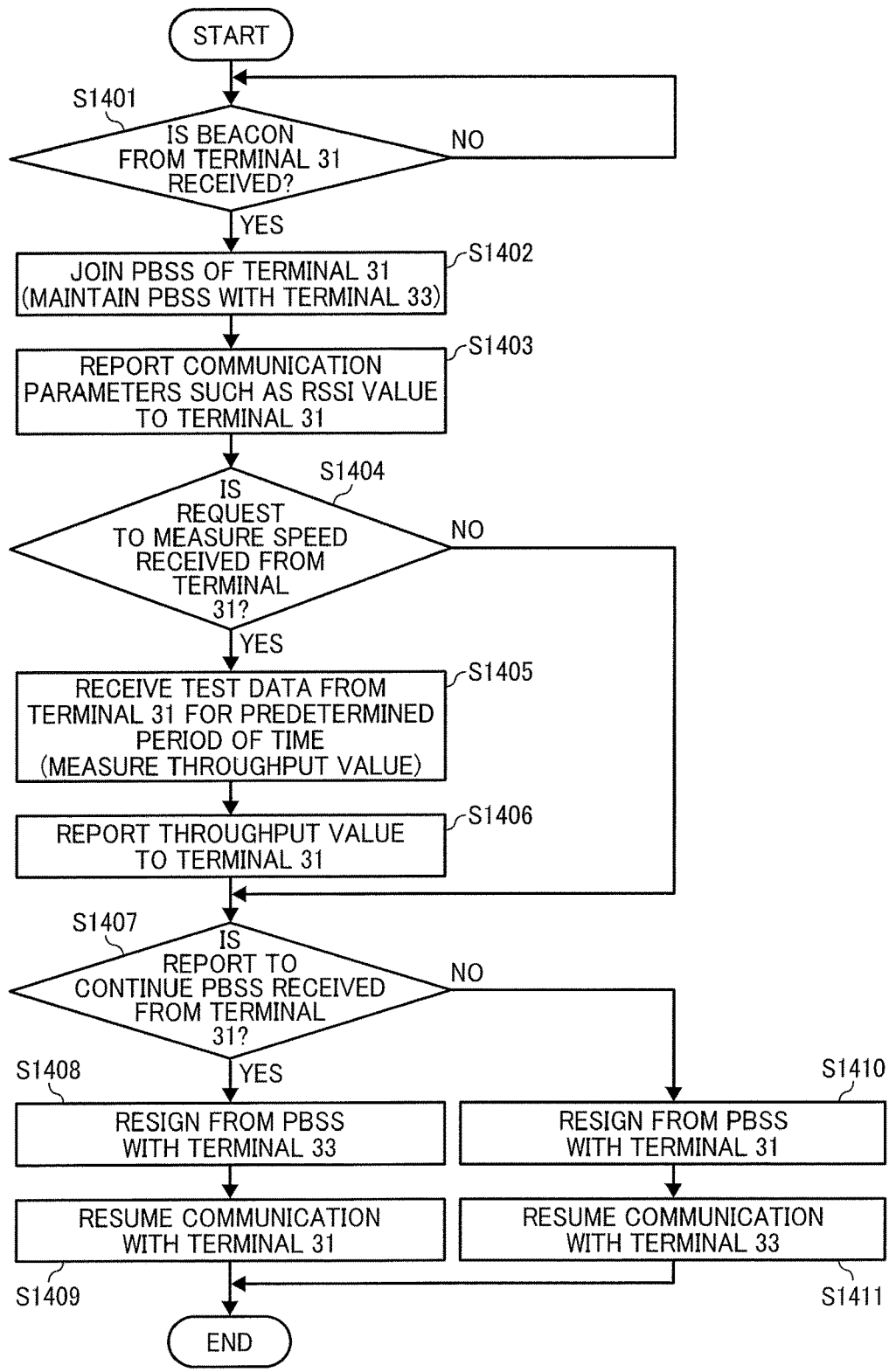
FIG. 14 is a flowchart illustrating an operation of a wireless communication apparatus 35 when a communication link is recovered as an embodiment of the present invention.

After the situation in FIG. 8, that is, the wireless terminal 33 becomes the relay apparatus to relay data sent by the wireless terminal 31 to the wireless terminal 35, FIGS. 12 to 14 illustrate operations of each wireless terminal if the communication link between the wireless terminals 31 and 35 recovers.

FIGS. 12A and 12B are flowcharts illustrating an operation of the wireless terminal 31, FIG. 13 is a flowchart illustrating an operation of the wireless terminal 33, and FIG. 14 is a flowchart illustrating an operation of the wireless terminal 35. Wireless terminal 31 First, in FIG. 12A, the wireless terminal 31 transfers beacon frames in S1201 and waits for a response from the wireless terminal 35.

In FIG. 14, after receiving beacon frames from the wireless terminal 31 (YES in S1401), the wireless terminal 35 joins PBSS with the wireless terminal 31 and maintains PBSS with the wireless terminal 33 as the relay apparatus as well at the same time in S1402. The wireless terminal 35 transfers the result of beam-forming training based on the beacon frames from the wireless terminal 31 (i.e., communication parameters such as RSSI value and SNR value etc.) to the wireless terminal 31 in S1403.

Wireless Terminal 31

In FIG. 12A, after the communication parameter collection/determination unit 55 receives the request for joining PBSS from the wireless terminal 35 (YES in S1202), the wireless terminal 31 further receives communication parameters etc. such as RSSI value etc. in S1203 and determines whether or not the received communication parameters etc. are equal to or larger than a threshold value. If the received communication parameters etc. are equal to or larger than the threshold value (YES in S1204), the wireless terminal transfers a request to measure speed to the wireless terminal 35 in S1205. In this case, the request to join PBSS corresponds to operations of scanning and joining a network specified in IEEE 802.11ad standard.

By contrast, if the communication parameter received by the communication parameter collection/determination unit 55 is less than the threshold value (NO in S1204), the wireless terminal 31 does not resume the communication with the wireless terminal 35 and continues communication with the wireless terminal 33 in S1213.

Here, it is possible that the threshold value of the communication parameters varies depending on applications that use the wireless communication system. For example, if the wireless communication system is used by an application demanding real-time response, parameters such as communication delay time are weighed heavily. Otherwise, if the wireless communication system is used by an application demanding high-reliable communication, parameters such as RSSI value and SNR value are weighed heavily. As a result, it is possible to configure threshold values in accordance with the application that uses the wireless communication system.

Wireless Terminal 35

In FIG. 14, after receiving the request to measure speed from the wireless terminal 31 (YES in S1404), the wireless terminal 35 receives data from the wireless terminal 31 for a predetermined period of time as a test to measure a throughput value in S1405 and reports the measured throughput value to the wireless terminal 31 in S1406.

Wireless Terminal 31

On the other hand, in FIG. 12B, after receiving the throughput value from the wireless terminal 35 in S1206, the wireless terminal 31 determines whether or not PBSS with the wireless terminal 35 is maintained in S1207. If the PBSS is maintained (YES in S1207), the wireless terminal 31 transfers a notification of maintaining PBSS to the wireless terminal 35 in S1208. By contrast, if the PBSS is not maintained (NO in S1207), the wireless terminal 31 does not transfer the notification of maintaining PBSS, and the operation ends in S1209.

Wireless Terminal 35

In FIG. 14, after receiving the notification of maintaining PBSS from the wireless terminal 31 (YES in S1407), the wireless terminal 35 resigns from the PBSS with the wireless terminal 33 as the relay apparatus in S1408 and resumes communication with the wireless terminal 31 in S1409.

By contrast, in case of not receiving the notification of maintaining PBSS from the wireless terminal 31 (NO in S1407), the wireless terminal 35 resigns from the PBSS with the wireless terminal 31 in S1410 and resumes communication with the wireless terminal 33 as the relay apparatus 33 in S1411.

If the intended communication parameters such as RSSI value and SNR value etc. received from the wireless terminal 35 are equal to or larger than the threshold value, as described before, the predetermined operation for establishing the communication link between the wireless terminals 31 and 35 is performed. Likewise, the predetermined operations illustrated in FIGS. 12 and 13 are performed between the wireless terminals 31 and 33.

Wireless Terminal 31

First, in FIG. 12A, if the intended communication parameters etc. such as RSSI value and SNR value etc. received by the communication parameter collection/determination unit 55 from the wireless terminal 35 are equal to or larger than the threshold value (YES in S1204), the wireless terminal 31 transfers a request to stop communication with the wireless terminal 35 to the wireless terminal 33 in S1210. Subsequently, the wireless terminal 31 waits for a response from the wireless terminal 33. If there is a response from the wireless terminal 33 (YES in S1211), the wireless terminal 31 starts communication with each of the wireless terminals 33 and 35 respectively in S1212.

Wireless Terminal 33

In FIG. 13, after receiving the request to stop communication with the wireless terminal 35 from the wireless terminal 31 (YES in S1301), the wireless terminal 35 stops communication with the wireless terminal 35 in S1302 and transfers a response indicating that the wireless terminal 33 stops communication with the wireless terminal 35 in S1303. Subsequently, the wireless terminal 33 resumes communication with the wireless terminal 31 in S1304.

The wireless terminal 33 may delete PBSS with the wireless terminal 35 after stopping communication with the wireless terminal 35 in S1302. Otherwise, the wireless terminal 33 may delete PBSS with the wireless terminal 35 when the wireless terminal 35 resigns from PBSS with the wireless terminal 33 in S1408 after receiving the notification indicating that the wireless terminal 35 resigns from PBSS with the wireless terminal 33.

As described above, in the wireless communication system in this embodiment, after detecting that the communication link between the first wireless communication apparatus 31 that functions as PCP (i.e., the coordination apparatus) and the second wireless communication apparatus that functions as STA, the first wireless communication apparatus 31 requests the second wireless communication apparatus 33 whose communication link is not cut to perform the beam-forming training sequence directed to the second wireless communication apparatus whose communication link is cut. The second wireless communication apparatus 33 whose communication link is not cut receives the result of beam-forming training from the second wireless communication apparatus 35 whose communication link is cut. Subsequently, based on the received result of beam-forming training, new PBSS that the second wireless communication apparatus 33 whose communication link is not cut functions as the relay apparatus for the first wireless communication apparatus 31 is formed.

As a result, in the wireless communication network that the EHF wireless communication using the directional antenna is used, radio wave is easily imbibed and reflected by the obstacles, and the communication link is easily cut by the obstacles such as a person etc., it is possible to implement easily the multi-hop network that may dynamically modify the communication routing for ad-hoc (i.e., distributed-autonomous type) wireless communication.

Second Embodiment

Next, a wireless communication system in this embodiment is described below with reference to a communication network including four or more wireless communication apparatuses as an example.

Figure 15:
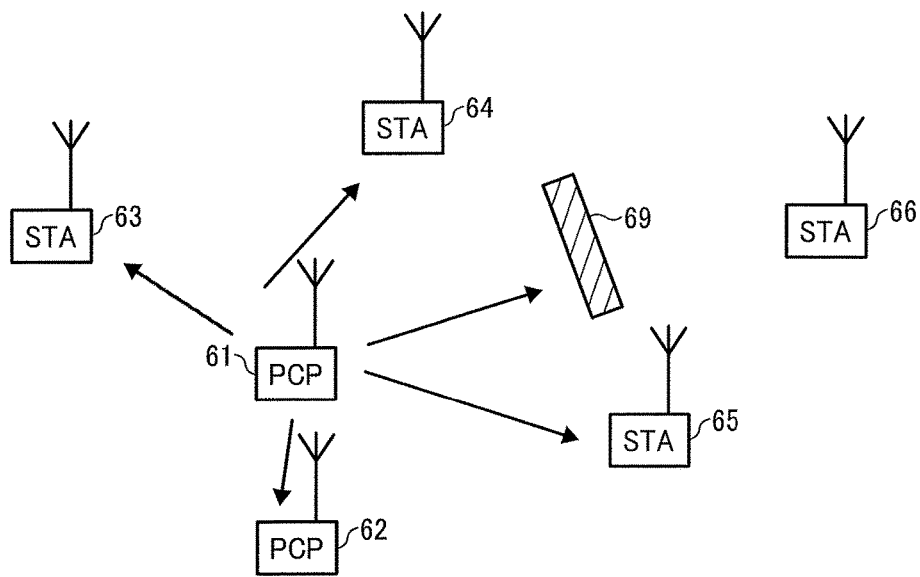
FIG. 15 is a diagram illustrating a situation that an obstacle appears on a communication path when multiple wireless communication apparatuses communicate with each other as an embodiment of the present invention.

In the following description, the wireless communication apparatus may be referred to as a wireless terminal or terminal. In FIG. 15, multiple wireless communication apparatuses communicate with each other. When the wireless terminal 61 (i.e., a first wireless communication apparatus) functions as PCP and communicates with the wireless terminals 62 to 66 (i.e., second wireless communication apparatuses), an obstacle 69 appears between the wireless terminals 61 and 66, and a communication link between the wireless terminal 61 and the wireless terminal 66 (the second wireless communication apparatus whose communication link is cut) is cut.

Figure 16:
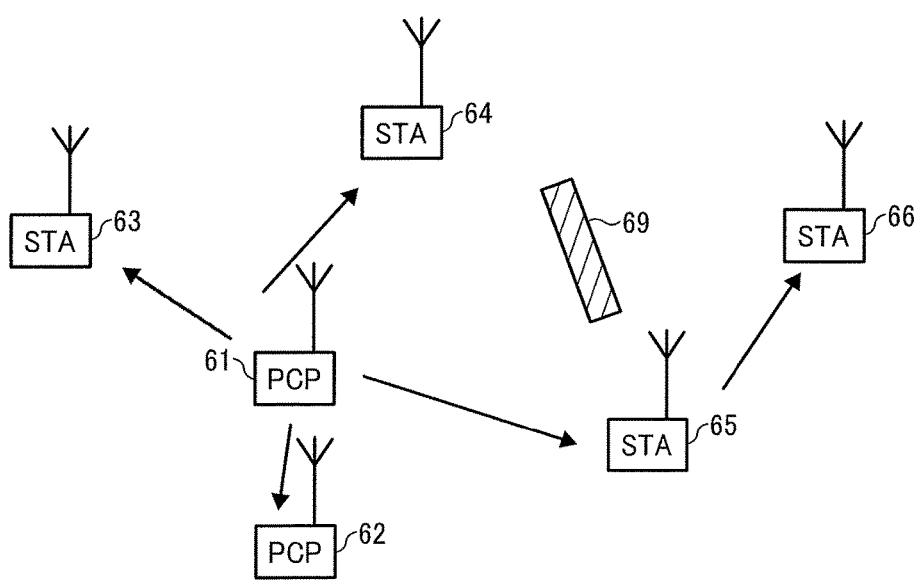
FIG. 16 is a diagram illustrating a situation that a wireless terminal 65 functions as a relay apparatus and a communication link is established between a wireless terminal 61 and a wireless terminal 66 when multiple wireless communication apparatuses communicate with each other as an embodiment of the present invention.
Figure 17B:
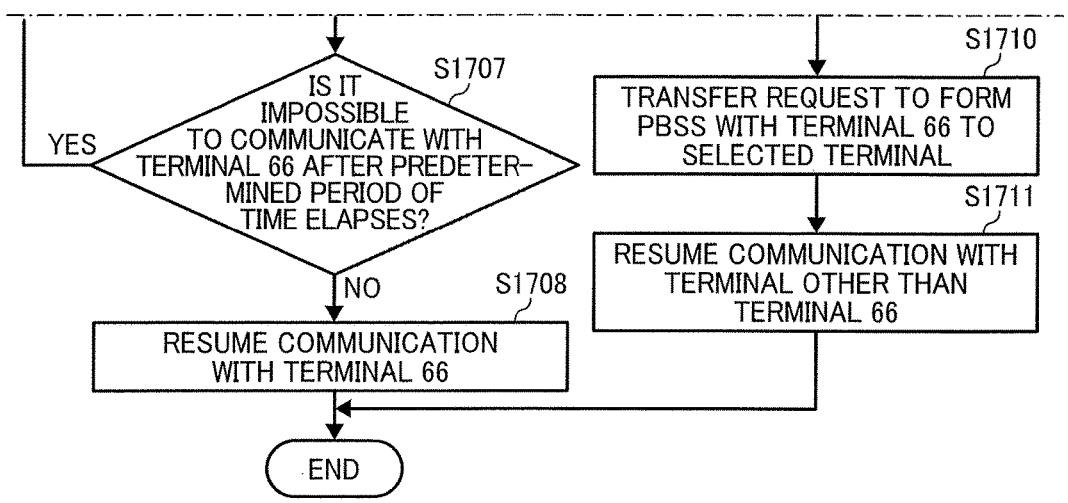

In FIG. 16, the wireless terminal 65 functions as a relay apparatus and a communication link between the wireless terminals 61 and 66 is established. FIGS. 17 to 19 are flowcharts illustrating operations of each wireless terminals in FIGS. 15 and 16. FIGS. 17A and 17B are flowcharts illustrating an operation of the wireless terminal 61. FIG. 18 is a flowchart illustrating an operation of the wireless terminal 64. FIG. 19 is a flowchart illustrating an operation of the wireless terminal 64. FIG. 20 is a flowchart illustrating operations in the wireless terminals 62, 63, and 65.

Wireless Terminal 61

First, in FIG. 17A, after detecting that the communication link with the wireless terminal 66 is cut (YES in S1701), in the wireless terminal 61, the beam-forming requester 53 transfers a communication link cut notification indicating that the communication link with the wireless terminal 66 is cut to the other connected wireless terminals 62, 63, 64, and 65 in S1702.

By contrast, if the wireless terminal 61 does not detect that the communication link with the wireless terminal 66 is cut (NO in S1701), the wireless 61 continues communication with connected multiple terminals in S1720.

In FIG. 17A, the notification indicating that the communication link is cut in S1702 is transferred to the other wireless terminals 62 to 65 connected to the wireless terminal 61 respectively. It should be noted that the communication link cut notification becomes a request for beam-forming training sequence.

That is, after the communication link cut notification is transferred to one wireless terminal and the wireless terminal that receives the communication link cut notification finishes performing an operation, the communication link cut notification to the next wireless terminal is sequentially transferred. Therefore, operations performed by the wireless communication terminals 62 to 65 connected to the wireless terminal 61 are performed sequentially.

The order of transferring the notification to the wireless terminals is determined appropriately. For example, it is possible to determine the order using individual IDs of each wireless terminals, and it is also possible to determine the order using the order of establishing communication link with the wireless terminal 61 that functions as PCP (i.e., the coordination apparatus).

An operation when the wireless terminal 64 receives the notification indicating that communication link is cut is described below. The similar operation is applied when the other wireless terminals 62, 63, and 65 receive the notification indicating that communication link is cut.

Wireless Terminal 64

In FIG. 18, after receiving the communication link cut notification as the request to perform beam-forming training sequence from the wireless terminal 61 (YES in S1801), the wireless terminal 64 checks whether or not the same communication link cut notification is received from other wireless terminals in S1802. In case of receiving the communication link cut notification (YES in S1802), the wireless terminal 64 transfers a response indicating that the wireless terminal 64 has already received the request from other terminal and already transferred the report or indicating a content to be reported in S1803.

To check whether or not the same communication link cut notification has already been received from other wireless terminals, it is possible to use an identifier such as a sequence number etc. indicating whether or not the notification is the same one.

By contrast, in case of not receiving the communication link cut notification from the wireless terminal 61 (NO in S1801), the wireless terminal 64 continues communication as is in S1804.

In FIG. 18, if the same communication link cut notification has not received yet from other wireless terminals (NO in S1802), in the wireless terminal 64, the beam-forming training sequence executor 54 transfers beacons only for the number of antenna sectors to the wireless terminal 66 to perform beam-forming training in S1805 and waits for a response indicating a result of beam-forming training from the wireless terminal 66.

After receiving the response from the wireless terminal 66 (YES in S1806), the wireless terminal 64 acquires a report regarding the communication parameters such as RSSI value etc. from the wireless terminal 66 in S1807.

Wireless Terminal 64

Figure 21:
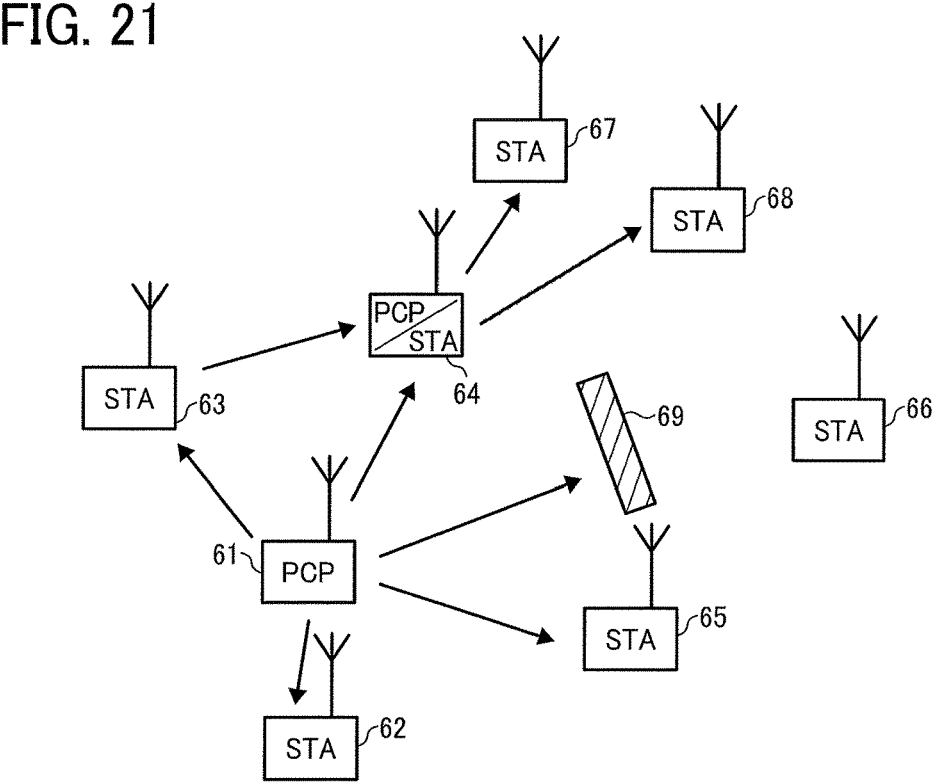
FIG. 21 is a diagram illustrating a network topology that same notifications are received from multiple wireless communication apparatuses as an embodiment of the present invention.

In case of receiving the same communication link cut notification that has already been received as described above, for example, it is possible to adopt a network topology illustrated in FIG. 21.

That is, the wireless terminal 64 receives the request from the wireless terminal 61. Subsequently, the wireless terminal 64 receives the same communication link cut notification from the wireless terminal 63 in that case. As described above, in case of receiving the same communication link cut notification that has already been received, the response indicating that the wireless terminal has already received the request from the other terminal and has already sent the report or indicating the content to be reported is transferred.

Wireless Terminal 64

By contrast, in FIG. 18, in case of not receiving the response from the wireless terminal 66 (NO in S1806), the wireless terminal 64 transfers beacons only for the predetermined SF period. If the SF period does not elapses (NO in S1808), the wireless terminal 64 continues transferring beacons. If the SF period elapses (YES in S1808), the wireless terminal 64 adds a content indicating that there is no response from the wireless terminal 66 to the report in S1809.

Wireless Terminal 66

In FIG. 20, in the wireless terminal 66, after the data communication status detector 52 detects that the communication link with the wireless terminal 61 is cut (YES in S1901), the wireless terminal 66 transitions to the scan mode in S1902. In case of not detecting that the communication link is cut (NO in S1901), the wireless terminal 66 continues communication with the wireless terminal 61 in S1903.

After transitioning to the scan mode, the wireless terminal 66 detects whether or not beacons are received from a wireless terminal. In case of receiving beacons (YES in S1904), the report is transferred to the wireless terminal as the beacon source in S1905 and starts communication with the terminal that transfers the request to join PBSS in S1906.

The report to the terminal as the beacon source includes communication parameters such as RSSI value and SNR value etc. whose quality in receiving beacons is the best and information on the antenna ID that acquires the communication parameters.

After receiving beacon frames, if communication parameters other than RSSI value and SNR value is required, by receiving test data etc., it is possible to measure communication parameters such as communication rate, maximum MCS value, average MCS value, link quality value, and the number of retransmission etc. and include the communication parameters in the report.

In FIG. 20, after the wireless terminal 66 transitions to the scan mode, in case of not receiving beacons from other terminals (NO in S1904), the wireless terminal 66 waits for receiving the request to join PBSS. In case of receiving the request to join PBSS (YES in S1907), the wireless terminal 66 starts communication with the terminal that transfers the request to join PBSS in S1906.

In case of not receiving the request to join PBSS (NO in S1908), the wireless terminal 66 maintains the scan mode in S1908.

Wireless Terminal 64

Figure 22:
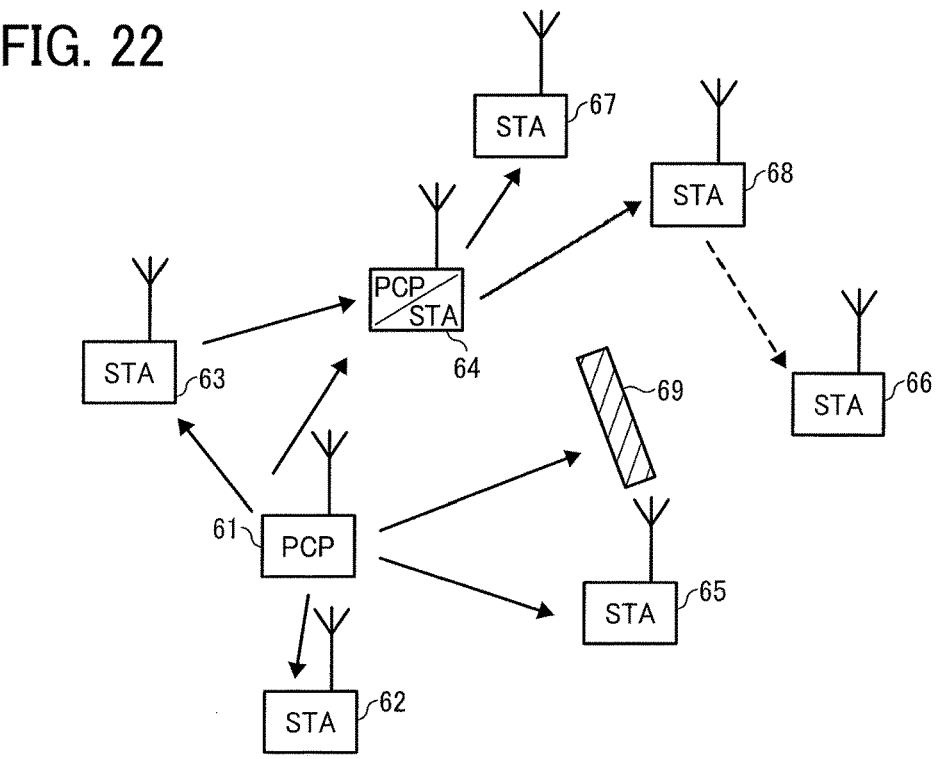
FIG. 22 is a diagram illustrating a situation that a communication path is established with the second wireless communication apparatus whose communication link was cut using the second wireless communication apparatus whose communication link is not cut in the network topology in FIG. 21.

In addition, as illustrated in FIG. 22, the wireless terminal 64 functions as STA in PBSS with the wireless terminal 61 and functions as PCP (i.e., the coordination apparatus) in PBSS with the wireless terminal 67 and 68.

In this case, in the operation illustrated in FIG. 18, it is checked wither or not there is a connected wireless terminal other than the wireless terminal 61, and it is required to pursue a possibility to form PBSS with the wireless terminal 66 whose communication link is cut regarding all wireless terminals that receive communication data from the wireless terminal 61.

Wireless Terminal 64

As a result, in FIG. 18, if there is another wireless terminal connected to the wireless terminal 64 that functions as PCP (YES in S1810), the wireless terminal transitions to the operation in FIG. 19 and reports to one of the connected wireless terminals that has not been transferred the notification that the communication between the wireless terminals 61 and 66 is cut in S1811.

In FIG. 21, for example, the wireless terminal 64 reports to the wireless terminal 67 that the communication link between the wireless terminals 61 and 66 is cut, commands the wireless terminal 67 to perform the operation in FIG. 19 to reply the report including the result of beam-forming training directed to the wireless terminal 66 to the wireless terminal 64.

Wireless Terminal 64

In FIG. 19, the wireless terminal 64 waits for receiving the report from the wireless terminal 67 (i.e., the notification of finishing calculation) (NO in S1812). After receiving the report (the notification of finishing calculation) from the wireless terminal 67 (YES in S1812), the wireless terminal 64 determines whether or not the notification of finishing calculation is received from all connected terminals.

In FIG. 21, the wireless terminal 64 is connected to the wireless terminal 68 in addition to the wireless terminal 67. Since the wireless terminal 64 has not received the report as the notification of finishing calculation from the wireless terminal 68 yet (NO in S1813), the wireless terminal 64 goes back to the step S1811 again and performs the same operation directed to the wireless terminal 68.

As described above, the notification to the wireless terminal 67 and 68 from the wireless terminal 64 that functions as the relay apparatus between the wireless terminal 61 and the wireless terminal 67 and 68 and operations on the wireless terminals 67 and 68 are performed sequentially.

Wireless Terminal 64

In FIG. 19, after receiving the report (the notification of finishing calculation) as the result of performing beamforming training directed to the wireless terminal 66 whose communication link is cut from all wireless terminals connected to the wireless terminal 64 (YES in S1813), the wireless terminal 64 transfers all reports from all connected terminals including the wireless terminal 64 itself to the wireless terminal 61 in a lump sum in S1814.

If there is no connected wireless terminal other than the wireless terminal 61 (NO in S1810), the wireless terminal 64 transfers the report of the wireless terminal 64 itself to the wireless terminal 61 in S1814.

Wireless Terminal 61

In FIG. 17A, the wireless terminal 61 waits for receiving the report as the notification of finishing calculation from the wireless terminal that transfers the communication link cut notification indicating that the communication link is cut (NO in S1703). After receiving the report from a wireless terminal (YES in S1703), the wireless terminal 61 determines whether or not the report is received from all connected terminals. If the report is not received from all connected terminals, the step goes back to S1702, and the operation continues.

By contrast, in FIG. 17A, if the wireless terminal 61 receives the report from all connected terminals (YES in S1704), the wireless terminal 61 determines whether or not the all received reports indicate that it is impossible to connect to the wireless terminal 66. If it is impossible to connect to the wireless terminal 66 (YES in S1705), the wireless terminal 61 resumes communication with terminals other than the wireless terminal 66 in S1706.

After that, when a predetermined period of time elapses, the wireless terminal 61 determines whether or not it is possible to communicate with the wireless terminal 66. If the situation that it is impossible to communicate with the wireless terminal 66 continues (YES in S1707), the step goes back to S1702, and the operation continues.

By contrast, when a predetermined period of time elapses, if it becomes possible to communicate with the wireless terminal 66 (NO in S1707), the wireless terminal 61 resumes communication with the wireless terminal 66 in S1708.

In FIG. 17A, if all the reports received from all connected terminals do not indicate that it is impossible to connect (NO in S1705), in consideration of communication parameters included in the received report such as RSSI value, SNR value, or communication throughput value etc., the wireless terminal 61 selects the best wireless terminal for forming PBSS with the wireless terminal 66 in S1709.

The wireless terminal 61 transfers a request to form PBSS with the wireless terminal 66 to the selected wireless terminal in S1710, and the wireless terminal 61 resumes communication with the wireless terminals other than the wireless terminal 66 in S1711

Wireless Terminal 64

In FIG. 19, the wireless terminal 64 determines whether or not the request to form PBSS with the wireless terminal 66 is received from the wireless terminal 61. If the request to form PBSS is not received (NO in S1815), the operation ends.

By contrast, if the request to form PBSS is received from the wireless terminal 61 (YES in S1615), the wireless terminal 64 checks whether or not the request to form PBSS is sent to the wireless terminal 64 itself. If the request is the request to form PBSS to the wireless terminal 64 itself, the wireless terminal 64 forms PBSS with the wireless terminal 66 in S1817.

In this case, the wireless terminal 64 functions as PCP, forms PBSS with the wireless terminal 66 as STA, and starts communication. After the wireless terminal 64 receives the request to form PBSS from the wireless terminal 61, if a target of the request to form PBSS is not the wireless terminal 64 itself but the wireless terminal connected to the wireless terminal 64 itself (NO in S1816), the wireless terminal 64 transfers the request to form PBSS with the wireless terminal 66 to the wireless terminal requested to form PBSS in S1818.

Wireless Terminal 64

In FIG. 19, for example, if the target of the request to form PBSS with the wireless terminal 66 is the wireless terminal 68, the wireless terminal 64 transfers the request to form PBSS to the wireless terminal 68. After the wireless terminal that receives the request to form PBSS itself performs the operation in the steps S1815 to S1817, PBSS that the wireless terminal functions as PCP and the wireless terminal 66 functions as STA is formed. (In FIG. 22, a broken line indicates a communication link between the wireless terminals 66 and 68.)

After receiving reports from all wireless terminals connected to the wireless terminal 61, if the communication parameters such as RSSI value, SNR value, or communication throughput value etc. included in the report indicating the result of beam-forming training received from the wireless terminal 65 are the best values, as illustrated in FIG. 16, the wireless terminal 64 forms PBSS that the wireless terminal 65 functions as PCP and the wireless terminal 66 functions as STA and forms a communication channel directed to the wireless terminal 66 whose communication link with the wireless terminal 61 is cut.

Regarding selecting the wireless terminal that functions as the relay apparatus, it is preferable that one wireless terminal whose all communication parameters are the best values. However, in some cases, there is no wireless terminal whose all communication parameters are the best values. In this case, it is possible to select a wireless terminal that owns communication parameters best for an application using the wireless communication network as the relay apparatus.

For example, if RSSI value is weighed heavily, it is possible that a wireless terminal that reports the largest RSSI value is selected as the relay apparatus. In case of a real-time oriented application, it is possible that a wireless terminal whose hopping number becomes the smallest is selected. As a result, in accordance with an application to be used, it is possible to control the system to select the best wireless terminal.

As described above, in using the wireless communication system that the EHF wireless communication whose radio wave directivity is strong and has a susceptibility to the obstacle on the communication path, if it is detected that the communication link with a wireless communication apparatus is cut, the other wireless communication apparatuses whose communication link is not cut are requested to perform beam-forming training sequence directed to the wireless communication apparatus whose communication link is cut. Subsequently, after receiving the report as the result of beam-forming training sequence from the other wireless communication apparatuses whose communication link is not cut, the wireless communication apparatus that may establish the communication link with the wireless communication apparatus whose communication link is cut and whose communication quality and communication parameters required by the application that uses the wireless communication network are the best is selected. Subsequently, the selected wireless communication apparatus functions as the relay apparatus to construct the hopping channel (i.e., the alternative channel) dynamically. As a result, it is possible to perform stable communication.

Since beam-forming training sequence directed to the wireless communication apparatus whose communication link is cut is performed on the wireless communication apparatuses whose communication link is established sequentially, it is possible to repeat inquiry and response for each terminal to select a terminal to be a candidate for the relay apparatus reliably.

Furthermore, all the wireless communication apparatus joining the wireless communication system in this embodiment may function as PCP and STA. Therefore, it is possible to implement bidirectional interactive communication.

In the above description, EHF wireless communication technology (i.e., WiGig and IEEE 802.11ad etc.) is taken as an example of the ad-hoc high-speed wireless communication using the directional antenna. However, the embodiment is not limited to wireless communication compatible with IEEE 802.11ad standard, and the embodiment may be applied to wireless communication systems using the directional antenna that the communication link may be cut due to the obstacles etc. between the wireless communication apparatuses.

The present invention also encompasses a non-transitory recording medium storing a program that executes a wireless communication method, performed by a wireless communication system. The wireless communication method, performed by the wireless communication system, includes the steps of detecting that a wireless communication between the first wireless communication apparatus and at least one of the second wireless communication apparatuses is disconnected, requesting, if it is detected that the wireless communication with at least one of the second wireless communication apparatuses is disconnected, one of the second wireless communication apparatuses whose wireless communication is not disconnected to perform beam-forming training sequence directed to the second wireless communication apparatus whose wireless communication is disconnected, and determining, based on a result of the beam-forming training sequence acquired from the second wireless communication apparatus whose wireless communication is not disconnected, the second wireless communication apparatus whose wireless communication is not disconnected as a relay apparatus for the second wireless communication apparatus whose wireless communication is disconnected.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable, program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these. Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A wireless communication system, comprising:
a first wireless communication apparatus; and
multiple second wireless communication apparatuses,
wherein the first wireless communication apparatus transfers communication data to the multiple second wireless communication apparatuses using wireless communication,
the first wireless communication apparatus includes circuitry to:
detect that a wireless communication between the first wireless communication apparatus and at least one of the second wireless communication apparatuses is disconnected;
request, if the circuitry detects that the wireless communication with at least one of the second wireless communication apparatuses is disconnected, one of the second wireless communication apparatuses whose wireless communication is not disconnected to perform beam-forming training sequence directed to the second wireless communication apparatus whose wireless communication is disconnected; and
determine, based on a result of the beam-forming training sequence acquired from the second wireless communication apparatus whose wireless communication is not disconnected, the second wireless communication apparatus whose wireless communication is not disconnected as a relay apparatus for the second wireless communication apparatus whose wireless communication is disconnected.

2. The wireless communication system according to claim 1, wherein the circuitry sequentially requests the beam-forming training sequence directed to the second wireless communication apparatus whose wireless communication is not disconnected.

3. The wireless communication system according to claim 1, wherein the circuitry determines a data communication routing based on a signal strength value and a SNR value on a communication channel between the second wireless communication apparatus whose wireless communication is not disconnected and the second wireless communication apparatus whose wireless communication is disconnected, respectively, received from the second wireless communication apparatus whose wireless communication is not disconnected.

4. The wireless communication system according to claim 1, wherein the second wireless communication apparatus whose wireless communication with the first wireless communication apparatus is disconnected transitions to a scan mode and waits for a beacon frame to be transmitted from other second wireless communication apparatus.

5. The wireless communication system according to claim 1, wherein the first wireless communication apparatus and the second wireless communication apparatus that becomes the relay apparatus function as a coordination apparatus, other second wireless communication apparatuses become stations, and the first wireless communication apparatus and the second wireless communication apparatuses together form a personal basic service set.

6. The wireless communication system according to claim 1, wherein the second wireless communication apparatus whose wireless communication is not disconnected that receives the request for the beam-forming training sequence transfers information on a signal strength value, SNR value, communication throughput value, maximum MCS value, average MCS value, a number of retransmission by transferring test data, connection quality value, and a number of hops to the second wireless communication apparatus whose wireless communication is disconnected to the first wireless communication apparatus, and,
based on the received information, the first wireless communication apparatus selects a relay apparatus for the second wireless communication apparatus whose wireless communication is disconnected.

7. The wireless communication system according to claim 1, wherein, if the second wireless communication apparatus whose wireless communication is not disconnected that receives the request for the beam-forming training sequence has already functioned as the relay apparatus, the relay apparatus performs the beam-forming training sequence directed to the second wireless communication apparatus whose wireless communication with the first wireless communication apparatus is disconnected,
requests the second wireless communication apparatus connected via the relay apparatus to perform the beam-forming training sequence directed to the second wireless communication apparatus whose wireless communication is disconnected, and
transfers a result of the beam-forming training sequence received from the second wireless communication apparatus whose wireless communication is not disconnected and a result of its own beam-forming training sequence to the first wireless communication apparatus.

8. The wireless communication system according to claim 7, wherein, if the relay apparatus has already been requested to perform the beam-forming training sequence by other first wireless communication apparatus when the relay apparatus is requested to perform the beam-forming training sequence, the relay apparatus responds to the first wireless communication apparatus that the relay apparatus has already been requested to perform the beam-forming training sequence by the other first wireless communication apparatus.

9. A first wireless communication apparatus, comprising circuitry to:
detecting that a wireless communication between the first wireless communication apparatus and at least one of the second wireless communication apparatuses is disconnected;
requesting, if the circuitry detects that the wireless communication with at least one of the second wireless communication apparatuses is disconnected, one of the second wireless communication apparatuses whose wireless communication is not disconnected to perform beam-forming training sequence directed to the second wireless communication apparatus whose wireless communication is disconnected; and
determining, based on a result of the beam-forming training sequence acquired from the second wireless communication apparatus whose wireless communication is not disconnected, the second wireless communication apparatus whose wireless communication is not disconnected as a relay apparatus for the second wireless communication apparatus whose wireless communication is disconnected.

10. A wireless communication method performed by a first wireless communication apparatus, which communicates with multiple second wireless communication apparatuses, the method comprising:
detecting that a wireless communication between the first wireless communication apparatus and at least one of the second wireless communication apparatuses is disconnected;
requesting, if it is detected that the wireless communication with at least one of the second wireless communication apparatuses is disconnected, one of the second wireless communication apparatuses whose wireless communication is not disconnected to perform beam-forming training sequence directed to the second wireless communication apparatus whose wireless communication is disconnected; and
determining, based on a result of the beam-forming training sequence acquired from the second wireless communication apparatus whose wireless communication is not disconnected, the second wireless communication apparatus whose wireless communication is not disconnected as a relay apparatus for the second wireless communication apparatus whose wireless communication is disconnected.

11. The wireless communication system according to claim 1,
wherein the circuitry sequentially requests the beam-forming training sequence directed to the second wireless communication apparatus whose wireless communication is not disconnected, and
determines a data communication routing based on a signal strength value and a SNR value on a communication channel between the second wireless communication apparatus whose wireless communication is not disconnected and the second wireless communication apparatus whose wireless communication is disconnected, respectively, received from the second wireless communication apparatus whose wireless communication is not disconnected.

12. The wireless communication system according to claim 1,
wherein the circuitry sequentially requests the beam-forming training sequence directed to the second wireless communication apparatus whose wireless communication is not disconnected, and
the second wireless communication apparatus whose wireless communication with the first wireless communication apparatus is disconnected transitions to a scan mode and waits for a beacon frame to be transmitted from other second wireless communication apparatus.

13. The wireless communication system according to claim 1,
wherein the circuitry determines a data communication routing based on a signal strength value and a SNR value on a communication channel between the second wireless communication apparatus whose wireless communication is not disconnected and the second wireless communication apparatus whose wireless communication is disconnected, respectively, received from the second wireless communication apparatus whose wireless communication is not disconnected, and the second wireless communication apparatus whose wireless communication with the first wireless communication apparatus is disconnected transitions to a scan mode and waits for a beacon frame to be transmitted from other second wireless communication apparatus.

14. The wireless communication system according to claim 1,
wherein the circuitry sequentially requests the beamforming training sequence directed to the second wireless communication apparatus whose wireless communication is not disconnected, and
determines a data communication routing based on a signal strength value and a SNR value on a communication channel between the second wireless communication apparatus whose wireless communication is not disconnected and the second wireless communication apparatus whose wireless communication is disconnected, respectively, received from the second wireless communication apparatus whose wireless communication is not disconnected, and
the second wireless communication apparatus whose wireless communication with the first wireless communication apparatus is disconnected transitions to a scan mode and waits for a beacon frame to be transmitted from other second wireless communication apparatus.

15. The wireless communication system according to claim 1,
wherein the circuitry sequentially requests the beamforming training sequence directed to the second wireless communication apparatus whose wireless communication is not disconnected, and
the first wireless communication apparatus and the second wireless communication apparatus that becomes the relay apparatus function as a coordination apparatus, other second wireless communication apparatuses become stations, and the first wireless communication apparatus and the second wireless communication apparatuses together form a personal basic service set.

16. The wireless communication system according to claim 1,
wherein the circuitry determines a data communication routing based on a signal strength value and a SNR value on a communication channel between the second wireless communication apparatus whose wireless communication is not disconnected and the second wireless communication apparatus whose wireless communication is disconnected, respectively, received from the second wireless communication apparatus whose wireless communication is not disconnected, and
the first wireless communication apparatus and the second wireless communication apparatus that becomes the relay apparatus function as a coordination apparatus, other second wireless communication apparatuses become stations, and the first wireless communication apparatus and the second wireless communication apparatuses together form a personal basic service set.

17. The wireless communication system according to claim 1,
wherein the second wireless communication apparatus whose wireless communication with the first wireless communication apparatus is disconnected transitions to a scan mode and waits for a beacon frame to be transmitted from other second wireless communication apparatus, and
the first wireless communication apparatus and the second wireless communication apparatus that becomes the relay apparatus function as a coordination apparatus, other second wireless communication apparatuses become stations, and the first wireless communication apparatus and the second wireless communication apparatuses together form a personal basic service set.

18. The wireless communication system according to claim 1,
wherein the circuitry sequentially requests the beamforming training sequence directed to the second wireless communication apparatus whose wireless communication is not disconnected, and
determines a data communication routing based on a signal strength value and a SNR value on a communication channel between the second wireless communication apparatus whose wireless communication is not disconnected and the second wireless communication apparatus whose wireless communication is disconnected, respectively, received from the second wireless communication apparatus whose wireless communication is not disconnected, and
the first wireless communication apparatus and the second wireless communication apparatus that becomes the relay apparatus function as a coordination apparatus, other second wireless communication apparatuses become stations, and the first wireless communication apparatus and the second wireless communication apparatuses together form a personal basic service set.

19. The wireless communication system according to claim 1,
wherein the circuitry sequentially requests the beamforming training sequence directed to the second wireless communication apparatus whose wireless communication is not disconnected,
the second wireless communication apparatus whose wireless communication with the first wireless communication apparatus is disconnected transitions to a scan mode and waits for a beacon frame to be transmitted from other second wireless communication apparatus, and
the first wireless communication apparatus and the second wireless communication apparatus that becomes the relay apparatus function as a coordination apparatus, other second wireless communication apparatuses become stations, and the first wireless communication apparatus and the second wireless communication apparatuses together form a personal basic service set.

20. The wireless communication system according to claim 1,
wherein the circuitry sequentially requests the beamforming training sequence directed to the second wireless communication apparatus whose wireless communication is not disconnected, and
determines a data communication routing based on a signal strength value and a SNR value on a communication channel between the second wireless communication apparatus whose wireless communication is not disconnected and the second wireless communication apparatus whose wireless communication is disconnected, respectively, received from the second wireless communication apparatus whose wireless communication is not disconnected, the second wireless communication apparatus whose wireless communication with the first wireless communication apparatus is disconnected transitions to a scan mode and waits for a beacon frame to be transmitted from other second wireless communication apparatus, and the first wireless communication apparatus and the second wireless communication apparatus that becomes the relay apparatus function as a coordination apparatus, other second wireless communication apparatuses become stations, and the first wireless communication apparatus and the second wireless communication apparatuses together form a personal basic service set.

* * * * *